(12) United States Patent
Yoshida et al.

(10) Patent No.: US 7,058,081 B2
(45) Date of Patent: Jun. 6, 2006

(54) TRANSMITTING APPARATUS, TRANSMITTING METHOD, SOURCE PACKET GENERATING APPARATUS, SOURCE PACKET GENERATING METHOD, PACKET MODE DETERMINING METHOD, MEDIUM AND PROGRAM

(75) Inventors: Junji Yoshida, Neyagawa (JP); Masazumi Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 780 days.

(21) Appl. No.: 09/934,120

(22) Filed: Aug. 21, 2001

(65) Prior Publication Data

US 2002/0075894 A1 Jun. 20, 2002

(30) Foreign Application Priority Data

Aug. 22, 2000 (JP) .............................. 2000-251485
Dec. 27, 2000 (JP) .............................. 2000-399304

(51) Int. Cl.
*H04J 3/16* (2006.01)
(52) U.S. Cl. ...................................... 370/466; 370/474
(58) Field of Classification Search .................... None
See application file for complete search history.

(56) References Cited

U.S. PATENT DOCUMENTS 6,243,395 B1 * 6/2001 Fujimori et al. ............ 370/466
6,788,710 B1 9/2004 Knutson et al.
6,801,544 B1 * 10/2004 Rijckaert et al. ........... 370/473

FOREIGN PATENT DOCUMENTS

| CN | 1233050 A | 10/1999 |
| EP | 0 758 826 A | 2/1997 |
| EP | 0 803 819 A | 10/1997 |
| EP | 0 838 926 A | 4/1998 |
| EP | 0 841 833 A | 5/1998 |
| EP | 0 942 556 A2 | 9/1999 |
| WO | WO 96/02098 A | 1/1996 |
| WO | WO 99/62216 | 12/1999 |
| WO | WO 01/56220 A1 | 8/2001 |

OTHER PUBLICATIONS

Chinese Office Action corresponding to application No. 01122293.X dated Oct. 15, 2004.

(Continued)

*Primary Examiner*—Huy D. Vu
*Assistant Examiner*—Daniel Ryman
(74) *Attorney, Agent, or Firm*—RatnerPrestia

(57) ABSTRACT

A transmitting apparatus for transmitting a source packet constructed of a pair of data of source packet data and a source packet header including a time stamp is provided. The transmission apparatus includes transmission packet generating means of investigating values of a predetermined portion of the time stamp included in the source packet when the source packet is inputted. The transmission packet generating means unifies source packets that have a same value for the predetermined portion and are inputted in series to be outputted as one unit of transmission packet data.

The transmission apparatus includes data outputting means of producing a transmission packet by adding predetermined additional information to the outputted transmission packet data and outputting the produced transmission packet outward.

8 Claims, 19 Drawing Sheets

OTHER PUBLICATIONS

Partial European Search Report for Application No. EP 01 12 0088, dated Sep. 27, 2005.

Kunzman, et al., "1394 High Performance Serial Bus: The Digital Interface for ATV," IEEE Transactions on Consumer Electronics, IEEE Inc. New York, US, vol. 41, No. 3, Aug., 1995, pp. 893-900.

European Search Report for Appl. No. EP 01 12 0088, dated Dec. 16, 2005.

* cited by examiner

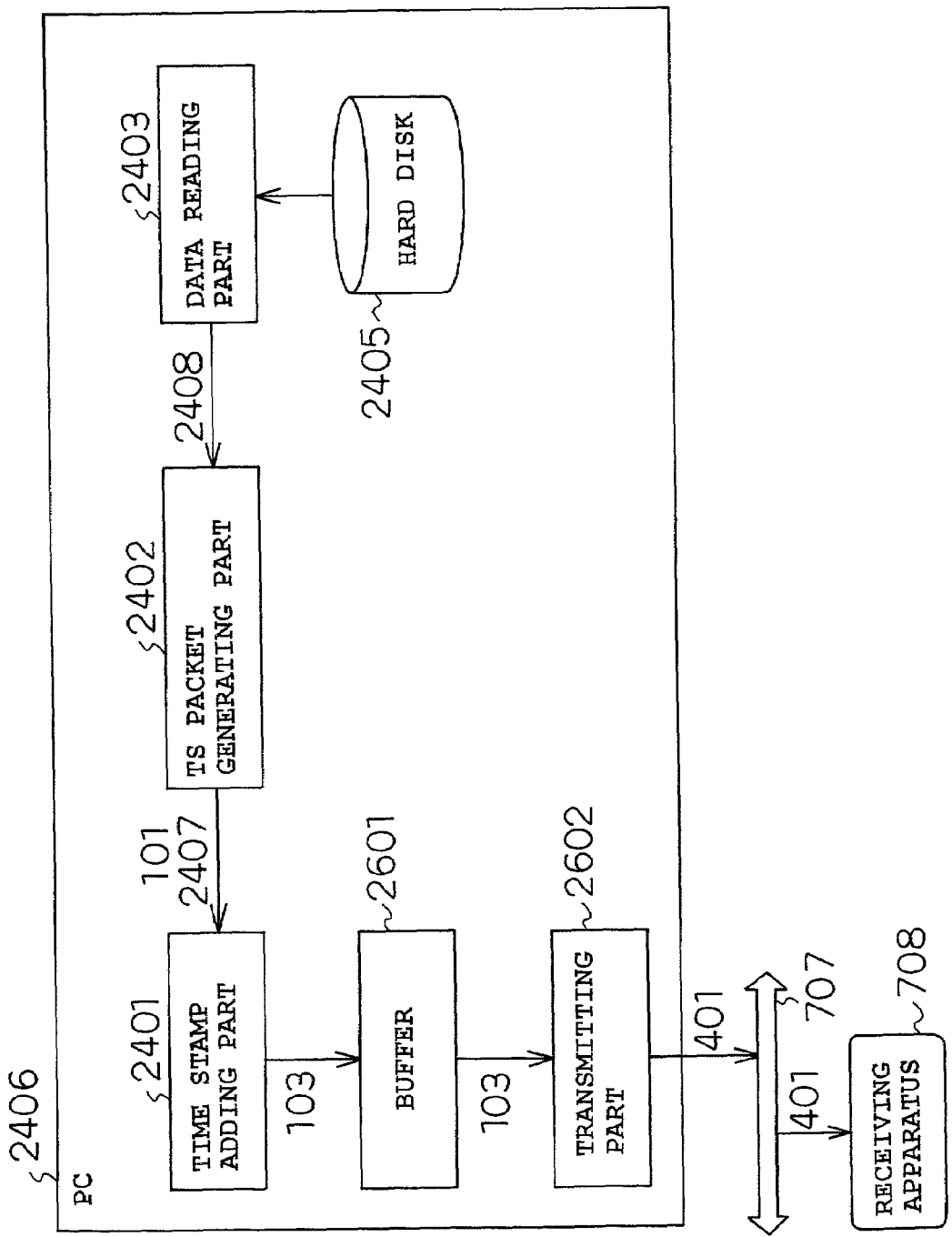

US 7,058,081 B2

TRANSMITTING APPARATUS, TRANSMITTING METHOD, SOURCE PACKET GENERATING APPARATUS, SOURCE PACKET GENERATING METHOD, PACKET MODE DETERMINING METHOD, MEDIUM AND PROGRAM

BACKGROUND OF THE INVENTION

1. Field of the Invention

The present invention relates to a transmitting apparatus that executes transmission processing by constructing transmission packet from a source packet including a source packet header, a packet mode determining method, a source packet generating apparatus for generating a source packet, a medium and a program.

2. Related Art of the Invention

Accompanied by progress of the LSI technology, a network to digitalize image information and sound information and transmit is being developed. Since the image signals and sound signals need to be reproduced in real time, a network that can execute real time transmission will become necessary.

As a network that is suitable for such real time transmission, there is a network called IEEE1394. The IEEE1394 can send data by synchronous transmission with a serial rapid bus system, and therefore real time transmission is possible.

The IEEE1394 can be mounted on a lot of digital image sound equipment including a Set Top Box (to be described as "STB" as follows) to receive MPEG2 data from satellite broadcasting etc. as an interface to be installed outside. For example, in an STB, the IEEE1394 is used so that data transmission between other AV equipment and the STB can be executed. IEC61883 has been established as standards for transmitting AV data such as MPEG2 with the IEEE1394.

On the other hand, also as for a personal computer (to be described as "PC" as follows), Windows98 of Microsoft Corporation being a standard OS has been used to support the IEEE1394 officially and consequently the IEEE1394 is rapidly proliferating in the PC industry as well.

Now, a method to transmit on the IEEE1394 a transport stream packet (to be described as "TS packet" as follows) of the MPEG2 in the IEC61883 will be described with reference to FIGS. 1 to 6.

FIG. 1 is a construction of a source packet. In FIG. 1, reference numeral 101 denotes a TS packet, reference numeral 102 denotes a source packet header, and reference numeral 103 does a source packet.

FIG. 2 is a construction of a source packet header 102. In FIG. 2, reference numeral 201 denotes a time stamp and reference numeral 202 denotes spare information.

FIG. 3 denotes a construction example of CIP data. In FIG. 3, reference numeral 301 denotes a CIP header and reference numeral 302 denotes CIP data.

FIG. 4 is a construction of an isochronous packet. In FIG. 4, reference numeral 401 denotes the isochronous packet, reference numeral 402 denotes an isochronous header, reference numeral 403 denotes a header CRC and reference numeral 404 denotes data CRC.

FIG. 5 is a conceptual view at the time of transmission of TS packets 101.

FIG. 6 is a construction of Cycle Time Register (to be described as "CTR" as follows) in the IEEE1394. In FIG. 6, reference numeral 601 denotes a CTR.

Firstly, as shown in FIG. 1, the source packet header 102 is added to the TS packet 101 so as to construct the source packet 103. As shown in FIG. 2, the source packet header 102 is constructed of a 25-bit time stamp 201 and a 7-bit spare information 202. Time information showing transmission timing of the TS packet 101 is described in the time stamp 201, and the spare information 202 is a region booked for the future where 0 is described for all the 7 bits currently. Details on the time stamp 201 will be described later.

Next, the CIP data 302 is constructed from the source packet 103. The construction method varies more or less corresponding with transmission rates of data. FIG. 3 is an example of a construction method of the CIP data 302, and the CIP data 302 are constructed by adding the CIP header 301 to the source packet 103.

In the case where the transmission rate is low, there is a case that the source packet 103 is split into 2 units, 4 units or 8 units and CIP headers 301 are added thereto respectively so that the CIP data 302 are constructed. However, in this case, in that stream, the number of units of splittings cannot be changed.

In addition, in the case where the transmission rate is high, a plurality of units of the source packet 103 are unified and the CIP header 301 is added hereto so that the CIP data 302 can be constructed. In this case, inside that stream, the number of units of the source packets 103 included in a unit of the CIP data 302 can be changed.

Alternatively, or for the purpose of adjusting the transmission rate, the CIP data 302 can be constructed only of the CIP header 301 as well. Such a packet, that does not always transmit actual data, is thus called "Empty packet".

Lastly, as shown in FIG. 4, the isochronous header 402, the header CRC 403 and the data CRC 404 are added to the CIP data 302 so that isochronous packet 401 being the transmission format of the IEEE1394 is generated. The header CRC 403 is information for correcting errors of the isochronous header 402, and the data CRC 404 are information for correcting errors of the CIP data 302.

Incidentally, in the transport stream of the MPEG2, there exists a TS packet including time information (Program Clock Reference=PCR), and when the transmission timing of that packet is deviated, a problem such as a color deviation takes place for display subject to decoding, and in some cases, such a case that decoding cannot be executed at all could take place. Therefore, the receiving party must reproduce the same timing as the transmitting party.

However, actually, transmission jitter in the IEEE1394 bus and delay inside equipment and the like exist, and timing when the receiving party receives the isochronous packet mostly deviates from the original timing as in FIG. 5.

Under the circumstance, in an IEC61883, the time stamp 201 showing the time information is supposed to be added to the source packet header 102 so that the receiving party can reconstruct the timing of the TS packet 101.

The time stamp 201 for use is a value subject to a certain constant offset onto the time when the TS packet 101 has arrived at the transmitter. The receiving party can reproduce the timing of the original stream by outputting to a decoder etc. at the time expressed by this time stamp 201. At this time, the timing of each TS packet will be subject to only delay covering the offset from the original stream as in FIG. 5.

The value of the time stamp 201 is expressed with the value of the CTR of the IEEE1394. The CTR of the IEEE1394 is constructed of 7-bit Second_Count, 13-bit Cycle_Count, and 12-bit Cycle_Offset as in FIG. 6, but the value of the time stamp 201 is constructed of the lower 25 bits among these, that is, the Cycle_Count and the Cycle_Offset.

Incidentally, when the TS packet as described above is transmitted with IEEE1394, for example when the TS packet data are inputted to the transmitting party in real time, it will do so if the value of CTR inside the IEEE1394 interface is taken out at that point of time and an offset is added thereto to produce the time stamp.

On the contrary hereto, for example when the TS packet data are stored on a hard disk of a PC and the TS packet data are read out from a hard disk and are transmitted, in order to determine the transmission timing of the TS packet, such a method has been proposed that the value of the time stamp having been added to the TS packet in the transmitting party in advance is stored in the hard disk together with the TS packet and this time stamp value is utilized to determine the transmission timing of the TS packet.

According to this method, construction of a PC will not be complicated, and even if a part of or the whole of the IEEE1394 interface is constructed of softwares of a PC, the TS packets can be transmitted to the IEEE1394 bus easily.

That is, in the case where TS packet data are stored on the hard disk of the PC and the TS packet data are read out from the hard disk and are transmitted, it is necessary to detect the value of PCR included in the TS packet and to reproduce the transmission timing of the TS packets, and thus the construction will become complicated. However, this proposed method utilizes the value of the stored time stamp to determine the transmission timing of the TS packet, and therefore, it is not necessary to detect the PCR and to reproduce the transmission timing of the TS packet, and therefore, as described above, construction of the PC will not get complicated.

In addition, in the case where a part of or the whole of the IEEE1394 interface is constructed of softwares of the PC and the time stamp has to be produced with softwares, when the CTR value is taken out from the IEEE1394 interface it gives rise to a delay, that delay amount is not constant and cannot be predicted, and therefore it is difficult to produce an exact time stamp. However, according to this method, the value of the stored time stamp is utilized to determine the value of the time stamp to be added to the TS packet, and therefore, even if the whole of or a part of the IEEE1394 interface is constructed of softwares of a PC, exact time stamps can be produced.

In addition, in case of a TS packet having been produced subject to encoding with software of a PC, it is necessary to newly produce and add a value of the time stamp.

In the case where TS packet data are read out from a hard disk and are transmitted with IEEE1394 as described above, it has to be determined how respective TS packets are integrated to an isochronous packet or how an Empty packet is inserted therein based on value of a time stamp that has been added in advance. However, so far means of determining how integration into an isochronous packet is actually executed or how an Empty packet is inserted based on value of the added time stamp has not been provided.

That is, there is a problem that there does not exist any means of determining how TS packets are integrated to an isochronous packet or how an Empty packet is inserted therein based on value of a time stamp that has been added in advance.

The present invention has been completed in view of such conventional problems, and an objective thereof is to provide transmitting apparatuses, transmitting method, packet mode determining methods, media and programs that can easily determine how the TS packet data are transmitted based on the value of the time stamp in the case where TS packet data are read out from a hard disk and are transmitted with IEEE1394.

In addition, when the TS packet data are produced subject to encoding with software of a PC for example, when the TS packet data exist on the PC and this TS packet data is to be transmitted with IEEE1394 from the PC, it is necessary that such a time stamp that can specify a transmission timing of the TS packet is produced in advance.

However, a PC that can normally transmit with IEEE1394 the TS packets produced subject to encoding with a software of the PC is not known.

That is, as for conventional PCs, there is a problem that there does not exist any such PC that can normally transmit with IEEE1394 those TS packet data in the case where TS packet data exist on a PC.

SUMMARY OF THE INVENTION

The present invention has been completed in view of such conventional problems, and an objective thereof is to provide a source packet generating apparatus, source packet generating method, a medium, and a program that can easily produce and add time stamps for transmitting the TS packet data with IEEE1394 on a PC, and accordingly can normally transmit with IEEE1394 the TS packet produced on the PC.

One aspect of the present invention is a transmitting apparatus for transmitting a source packet constructed of a pair of data of a source packet data and a source packet header including a time stamp, comprising:

transmission packet generating means of investigating values of a predetermined portion of said time stamp included in said source packet when said source packet is inputted, unifying said source packets that have a same value for said predetermined portion and are inputted in series to output as one unit of transmission packet data; and data outputting means of producing a transmission packet by adding predetermined additional information to said outputted transmission packet data and outputting said produced transmission packet outward.

Another aspect of the present invention is the transmitting apparatus according to 1st invention, wherein said transmission packet generating means outputs (N−1) units of dummy transmission packet data to said data outputting means, in the case where difference between values of said predetermined portions of said time stamps included in two source packets inputted in series is N being $N \geq 2$.

Still another aspect of the present invention is a transmitting apparatus for transmitting a source packet constructed of a pair of data of the source packet data and a source packet header including a time stamp, comprising:

split number designating means of designating a split number M ($M \geq 1$) to split said source packet;

transmission packet generating means of investigating values of a predetermined portion of said time stamp included in said source packet when said source packet is inputted, outputting said M units split from said source packet as transmission packet data when difference between values of predetermined portions of said time stamp included in said two source packets in series is $N(N \geq 0)$ being $N \leq L(L \geq 1)$, and outputting (N−L) units of dummy transmission packet data when difference between values of said predetermined portions of said time stamp is N being N>L; and data outputting means of outputting as transmission packet outward those being said outputted transmission packet data and/or said dummy transmission packet data to which a predetermined additional information is added.

Yet still another aspect of the present invention is the transmitting apparatus according to 3rd invention, wherein said M is 2, 4 or 8.

Still yet another aspect of the present invention is the transmitting apparatus, wherein K units of said source packets having variable length or fixed length with $K \geq 1$ are inputted as a group to said transmission packet generating means.

A further aspect of the present invention is the transmitting apparatus, wherein said predetermined additional information is a CIP header, an isochronous header, a header CRC and a data CRC, said data outputting means has: a CIP header adding means of adding said predetermined CIP header to said outputted transmission packet data; and an IEEE1394 interface for producing said transmission packet by further adding said isochronous header, said header CRC and said data CRC to the transmission packet data to which said predetermined CIP header is added and outputting said produced transmission packet outward.

A still further aspect of the present invention is the transmitting apparatus, wherein data of said source packet are a transport stream packet of MPEG.

A yet further aspect of the present invention is the transmitting apparatus, wherein said time stamp is expressed with Cycle_Count and Cycle_Offset of CycleTimeRegister of IEEE1394 standards, and said predetermined portion is a portion of said Cycle_Count.

A still yet further aspect of the present invention is a packet mode determining method, wherein upon receipt of a source packet constructed of a pair of data of the source packet data and a source packet header including a time stamp, FALSE is substituted for a flag F expressed by TRUE or FALSE, and at the same time, difference N between a value of said time stamp included in said source packet received immediately prior thereto and a value of the time stamp included in said source packet received this time is calculated;

in the case where N=0 is given, and the flag F expressed by TRUE or FALSE gives F=TRUE, and a first buffer expressed by a pair of two units of numeric values being (X1, Y1) fulfills X1=1 and Y1>1, after Y1 is replaced with (Y1−1), (X1, Y1) being contents of said first buffer is added to a packet mode list, and moreover X1=2, Y1=1 are substituted for said first buffer;

in the case where N=0 is given, and said flag F is F=TRUE, and the first buffer expressed by a pair of two units of numeric values being (X1, Y1) is X1≠1 and/or Y1≦1, X1 is replaced with (X1+1);

in the case where N=0 is given, and said flag F is F=TRUE, X1 of the first buffer expressed by a pair of two units of numeric values being (X1, Y1) is replaced with (X1+1);

in the case where N=1, and said flag F is F=FALSE and X2≦1, 1 is substituted for X1 and Y1 is replaced with (Y1+1);

in the case where N=1, and said flag F is F=FALSE and X2>1, said flag F is made to constitute F=TRUE and, at the same time, 1 is substituted for X2 and Y2 is replaced with 1;

in the case where N=1, and said flag F is F=TRUE and X2=0, Y1 is replaced with (Y1+1) and, at the same time, 1 is substituted for X2;

in the case where N=1, and said flag F is F=TRUE and X2>0 and X1=X2, Y1 is replaced with (Y1+1) and, at the same time, 1 is substituted for X2 and 1 is substituted for Y2;

in the case where N=1, and said flag F gives F=TRUE, X2>0, X1≠X2, and X2>1, after adding (X1, Y1) being contents of said first buffer to said packet mode list, X2 is substituted for X1 and Y2 is substituted for Y1 and thereafter 1 is substituted for X2 and 1 is substituted for Y2;

in the case where N=1 is given, and said flag F gives F=TRUE, X2>0, X1≠X2, and X2≦1, after adding (X1, Y1) being contents of said first buffer to said packet mode list, 0 is substituted for X2 and 0 is substituted for Y2 and thereafter 1 is substituted for X1, 2 is substituted for Y1 and FALSE is substituted for F;

in the case where N≧2 is given, and said flag F gives F=FALSE, (X1, Y1) being contents of said first buffer to said packet mode list, and in the case where N≧2 is given, and said flag F gives F=TRUE and X1=X2 is given, Y1 is replaced with (Y+1) and thereafter (X1, Y1) being contents of said first buffer is added to said packet mode list;

in the case where N≧2 is given, and said flag F gives F=TRUE and X1≠X2 is given, (X1, Y1) being contents of said first buffer is added to said packet mode list, and moreover (X2, Y2) being contents of said second buffer is added to said packet mode list;

in the case where N≧2 is given, (0, N−1) is added to said packet mode list and 1.1, 0, 0, and False are substituted for X1, Y1, X2, Y2 and F, respectively;

lastly for each item (K, L) of said packet mode list, in case of K≧1, K units of said source packets are constructed as one unit of transmission packet data and L units of said transmission packet data including K units of said source packets are arranged in series; and in case of K=0, with dummy data being said transmission packet, L units of said dummy data are arranged in series.

An additional aspect of the present invention is the packet mode determining method, wherein N=1, X1=1, and Y1=0 in case of initially received said source packet.

A still additional aspect of the present invention is a packet mode determining method;

wherein upon receipt of a source packet of T units for one pair (T≧1) constructed of a pair of data of the source packet data and a source packet header including a time stamp, in the case where J units (J≧1) of said source packets are in safekeeping in a shunting buffer, a pair of (0, N0−1) is added to a packet mode list only when the kept difference number N0 is N0>1, and thereafter for a first buffer expressed by a pair of two units of numeric values being (X1, Y1), J is substituted for X1 and 1 is substituted for Y1;

among M units of said source packets, all said source packets that have the same value as that in a predetermined portion of said time stamp of said source packet located in the last and that are brought into series with said source packet located in the last are stored into said shunting buffer;

the number of units of said source packets stored in said shunting buffer is substituted for J;

difference between said time stamp of said source packet of the last among said source packet that are not stored in said shunting buffer and said time stamp of said source packets that is stored in said shunting buffer is substituted for said kept difference number N0;

FALSE is substituted for a flag F expressed by TRUE or FALSE and M units of said source packets are checked sequentially from the head;

difference N between a value of said time stamp included in said source packet checked immediately prior thereto and a value of said time stamp included in said source packet checked this time is calculated;

in the case where N=0 is given, and the flag F expressed by TRUE or FALSE gives F=TRUE, and a first buffer expressed by a pair of two units of numeric values being (X1, Y1) fulfills X1=1 and Y1>1, after Y1 is replaced with (Y1−1), (X1, Y1) being contents of said first buffer is added to a packet mode list, and moreover X1=2, Y1=1 are substituted for said first buffer;

in the case where N=0 is given, and said flag F is F=TRUE, and the first buffer expressed by a pair of two units of numeric values being (X1, Y1) is X1≠1 and/or Y1≦1, X1 is replaced with (X1+1);

in the case where N=0 is given, and said flag F is F=TRUE, X1 of the first buffer expressed by a pair of two units of numeric values of (X1, Y1) is replaced with (X1+1);

in the case where N=1, and said flag F is F=FALSE and X2≦1, 1 is substituted for X1 and Y1 is replaced with (Y1+1)

in the case where N=1, and said flag F is F=FALSE and X2>1, said flag F is made to constitute F=TRUE and, at the same time, 1 is substituted for X2 and Y2 is replaced with 1;

in the case where N=1, and said flag F is F=TRUE and X2=0, Y1 is replaced with (Y1+1) and, at the same time, 1 is substituted for X2;

in the case where N=1, and said flag F is F=TRUE and X2>0 and X1=X2, Y1 is replaced with (Y1+1) and, at the same time, 1 is substituted for X2 and 1 is substituted for Y2;

in the case where N=1, and said flag F gives F=TRUE, X2>0, X1≠X2, and X2>1, after adding (X1, Y1) being contents of said first buffer to said packet mode list, X2 is substituted for X1 and Y2 is substituted for Y1 and thereafter 1 is substituted for X2 and 1 is substituted for Y2;

in the case where N=1 is given, and said flag F gives F=TRUE, X2>0, X1≠X2, and X2≦1, after adding (X1, Y1) being contents of said first buffer to said packet mode list, 0 is substituted for X2 and 0 is substituted for Y2 and thereafter 1 is substituted for X1, 2 is substituted for Y1 and FALSE is substituted for F;

in the case where N≧2 is given, and said flag F gives F=FALSE, (X1, Y1) being contents of said first buffer to said packet mode list, (X1, Y1) being contents of said first buffer is added to said packet mode list;

in the case where N≧2 is given, and said flag F gives F=TRUE and X1=X2 is given, Y1 is replaced with (Y+1) and thereafter; (X1, Y1) being contents of said first buffer is added to said packet mode list;

in the case where N≧2 is given, and said flag F gives F=TRUE and X1≠X2 is given, (X1, Y1) being contents of said first buffer is added to said packet mode list, and thereafter moreover (X2, Y2) being contents of said second buffer is added to said packet mode list;

in the case where N≧2 is given, after adding (0, N−1) to said packet mode list, 1, 1, 0, 0 and FALSE are substituted for X1, Y1, X2, Y2 and F, respectively; and after checking on all (T−J) units of said source packets comes to an end, in the case where said flag F is F=FALSE, (X1, Y1) being contents of said first buffer is added to said packet mode list;

in the case where said flag F gives F=TRUE and X1=X2, after Y1 is replaced with (Y+1), (X1, Y1) being contents of said first buffer is added to said packet mode list;

in the case where said flag F gives F=TRUE and X1≠X2, (X1, Y1) being contents of said first buffer is added to said packet mode list; and moreover (X2, Y2) being contents of said second buffer is added to said packet mode list;

lastly for each item (K, L) of said packet mode list, in case of K≧1, K units of said source packets are constructed as one unit of transmission packet data and L units of said transmission packet data including K units of said source packets are arranged in series; and in case of K=0, with dummy data being said transmission packet, L units of said dummy data are arranged in series.

A yet additional aspect of the present invention is the packet mode determining method, wherein N=1 and J=0 are given in case of initially received said source packet, and X1=0 and Y1=0 are given in case of said source packet located in the head amount T units of said source packets.

A still yet additional aspect of the present invention is a packet mode determining method, wherein upon receipt of a source packet constructed of a pair of data of the source packet data and a source packet header including a time stamp, difference N between a value of said time stamp included in said source packet received immediately prior thereto and a value of the time stamp included in said source packet received this time is calculated;

in the case where said N gives N>(A+1), (N−A−1) units of dummy packets are outputted, and thereafter said source packet received this time is split into M units and outputted, and at the same time (M−1) is substituted for A; and in the case where said N does not give N>(A+1), said source packet received this time is split into M units and outputted, and at the same time (M−N) is substituted for A.

A supplementary aspect of the present invention is the packet mode determining method, wherein N=1 and A=0 in case of initially received said source packet.

A still supplementary aspect of the present invention is the packet mode determining method, wherein said M is a value designated in advance.

A yet supplementary aspect of the present invention is the packet mode determining method, wherein said M is a value designated in advance.

A still yet supplementary aspect of the present invention is the packet mode determining method, wherein said M is received in a pair with said source packet.

Another aspect of the present invention is the packet mode determining method, that said M is received in a pair with said source packet.

Still another aspect of the present invention is the packet mode determining method, wherein said M is 2, 4 or 8.

Yet still another aspect of the present invention is the packet mode determining method, wherein data of said source packet are an MPEG transport stream packet.

Still yet another aspect of the present invention is the packet mode determining method, wherein said time stamp is expressed by Cycle_Count and Cycle_Offset of CycleTimeRegister of IEEE1394 standards; and said difference N is difference between said Cycle_Counts.

A further aspect of the present invention is a source packet generating apparatus, comprising:

packet generating means of generating a data packet transmitted in a first clock and determining transmission timing of said data packet expressed in said first clock; and time information adding means of converting said transmission timing to time information on a time axis expressed in a second clock, adding to said data packet the time stamp with a value determined based on all or a part of said time information and outputting a data packet to which the time stamp is added as a source packet;

wherein outputted said source packet is converted into a packet for transmission based on the value of that added time stamp is outputted from an interface.

A still further aspect of the present invention is the source packet generating apparatus, wherein in the case where a predetermined data packet in said data packet is given as a first data packet and the data packet other than said first data packet in said data packet is given as a second data packet, said time information adding means determines a value of time stamp to be added to said second data packet based on a value subject to conversion into time difference in said second clock from difference in said transmission timing in said first clock between said first data packet and said second data packet.

A yet further aspect of the present invention is the source packet generating apparatus, wherein said time information adding means gives a value of time stamp to be added to said first data packet being 0, and gives a value of time stamp to be added to said second data packet being a value subject to conversion into time difference in said second clock.

A still yet further aspect of the present invention is the source packet generating apparatus, wherein said time information adding means gives a value of time stamp to be added to said first data packet being a predetermined value, and gives a value of time stamp to be added to said second data packet being a value subject to addition of said predetermined value subject to conversion into time difference in said second clock.

An additional aspect of the present invention is the source packet generating apparatus, wherein said predetermined data packet is a head data packet.

A still additional aspect of the present invention is the source packet generating apparatus, wherein in the case where a data packet adjacent to a third data packet being a data packet with an already determined value of time stamp is given as a fourth data packet, said time information adding means gives a value subject to addition of a value of said time stamp added to said third data packet to a value subject to conversion into time difference in said second clock from difference in said transmission timing in said first clock between said third data packet and said fourth data packet being a value of said time stamp to be added to fourth data packet.

A yet additional aspect of the present invention is the source packet generating apparatus, wherein said time information adding means gives a value of time stamp to be added to a head data packet in said data packet being a predetermined value.

A still yet additional aspect of the present invention is the source packet generating apparatus, wherein a frequency of said first clock is 27 MHz, and said data packet is an MPEG2 transport stream packet.

A supplementary aspect of the present invention is the source packet generating apparatus, wherein said packet generating means outputs said MPEG2 transport stream packet subject to addition of a dummy time stamp instead of outputting said MPEG2 transport stream packet to said time information adding means, and said time information adding means replaces said dummy time stamp with the generated said time stamp.

A still supplementary aspect of the present invention is the source packet generating apparatus, wherein said packet generating means receives an MPEG2 program stream packet and generates said MPEG2 transport stream packet from said MPEG2 program stream packet.

A yet supplementary aspect of the present invention is the source packet generating apparatus, wherein said packet generating means receives an MPEG2 program stream packet and generates said MPEG2 transport stream packet from said MPEG2 program stream packet.

A still yet supplementary aspect of the present invention is the source packet generating apparatus, wherein a frequency of said second clock is approximately 24.576 MHz, said time information is a value based on CycleTimeRegister in IEEE1394 standards; and said time stamp is a time stamp described in a source packet header in IEC61883.

Another aspect of the present invention is the source packet generating apparatus, wherein said "output" means "output outward".

Still another aspect of the present invention is the source packet generating apparatus, comprising buffer means of storing a data packet to which said time stamp is added as a source packet, wherein said "output" means "write in said buffer", and when a predetermined number of units of said source packets are written in, said buffer means outputs said predetermined number of units of said source packets.

Yet still another aspect of the present invention is a program to cause a computer to function as a whole or a part of:

transmission packet generating means of investigating values of a predetermined portion of said time stamp included in said source packet when said source packet is inputted, unifying said source packets that have the same value for said predetermined portion and are inputted in series to output as one unit of transmission packet data, and data outputting means of producing transmission packet by adding predetermined additional information to said outputted transmission packet data and outputting said produced transmission packet outward, of the transmitting apparatus.

Still yet another aspect of the present invention is a program to cause a computer to function as a whole or a part of:

split number designating means of designating a split number M (M≧1) to split said source packet;

said transmission packet generating means of investigating values of a predetermined portion of said time stamp included in said source packet when said source packet is inputted, outputting said M units split from said source packet as transmission packet data when difference between values of said predetermined portions of said time stamp included in two source packets in series is N(N≧0) being N≦L(L≧1), and outputting (N−L) units of dummy transmission packet data when difference between values of said predetermined portions of said time stamp is N being N>L; and data outputting means of outputting as transmission packet outward those being said outputted transmission packet data and/or said dummy transmission packet data to which a predetermined additional information is added;

of the transmitting apparatus.

A further aspect of the present invention is a program to cause a computer to function as a whole or a part of:

packet generating means of generating a data packet transmitted in a first clock and determining transmission timing of said data packet expressed in said first clock; and time information adding means of converting said transmission timing to time information on a time axis expressed in a second clock, adding to said data packet the time stamp with a value determined based on all or a part of said time information and outputting a data packet to which the time stamp is added as a source packet;

of the source packet generating apparatus.

A still further aspect of the present invention is a medium, that can be processed by a computer, and that bears a program to cause the computer to function as a whole or a part of transmission packet generating means of investigating values of a predetermined portion of said time stamp included in said source packet when said source packet is inputted, unifying said source packets that have the same value for said predetermined portion and are inputted in series to output as one unit of transmission packet data, and data outputting means of producing transmission packet by adding predetermined additional information to said outputted transmission packet data and outputting said produced transmission packet outward, of the transmitting apparatus.

A yet further aspect of the present invention is a medium capable of being processed by a computer that bears a program to cause the computer to function as a whole or a part of split number designating means of designate a split number M (M≧1) to split said source packet;

said transmission packet generating means of investigating values of a predetermined portion of said time stamp included in said source packet when said source packet is inputted, outputting said M units split from said source packet as transmission packet data when difference between values of said predetermined portions of said time stamp included in two source packets in series is N(N≧0) being N≦L(L≧1), and outputting (N−L) units of dummy transmission packet data when difference between values of said predetermined portions of said time stamp is N being N>L; and data outputting means of outputting as transmission packet outward those being said outputted transmission packet data and/or said dummy transmission packet data to which a predetermined additional information is added, of the transmitting apparatus.

A still yet further aspect of the present invention is a medium capable of being processed by a computer that bears a program to cause the computer to function as a whole or a part of packet generating means of generating a data packet transmitted in a first clock and determining transmission timing of said data packet expressed in said first clock; and time information adding means of converting said transmission timing to time information on a time axis expressed in a second clock, adding to said data packet the time stamp with a value determined based on all or a part of said time information and outputting a data packet to which the time stamp is added as a source packet;

of the source packet generating apparatus.

An additional aspect of the present invention is a program to cause a computer to execute all or a part of the steps, in the packet mode determining method of:

upon receipt of a source packet constructed of a pair of data of the source packet data and a source packet header including a time stamp, substituting FALSE for a flag F expressed by TRUE or FALSE, and at the same time, calculating difference N between a value of said time stamp included in said source packet received immediately prior thereto and a value of the time stamp included in said source packet received this time;

in the case where N=0 is given, and the flag F expressed by TRUE or FALSE gives F=TRUE, and a first buffer expressed by a pair of two units of numeric values being (X1, Y1) fulfills X1=1 and Y1>1, after Y1 is replaced with (Y1−1), adding (X1, Y1) being contents of said first buffer to a packet mode list, and moreover substituting X1=2, Y1=1 for said first buffer;

in the case where N=0 is given, and said flag F is F=TRUE, and the first buffer expressed by a pair of two units of numeric values of (X1, Y1) is X1≠1 and/or Y1≦1, replacing X1 with (X1+1);

in the case where N=0 is given, and said flag F is F=TRUE, replacing X1 of the first buffer expressed by a pair of two units of numeric values (X1, Y1) with (X1+1);

in the case where N=1, and said flag F is F=FALSE and X2≦1, substituting 1 for X1 and replacing Y1 with (Y1+1);

in the case where N=1, and said flag F is F=FALSE and X2>1, making said flag F constitute F=TRUE, and, at the same time, substituting 1 for X2 and 1 for Y2;

in the case where N=1, and said flag F is F=TRUE and X2=0, replacing Y1 with (Y1+1) and, at the same time, substituting 1 for X2;

in the case where N=1, and said flag F is F=TRUE and X2>0 and X1=X2, replacing Y1 with (Y1+1) and, at the same time, substituting 1 for X2 and 1 for Y2 respectively;

in the case where N=1, and said flag F gives F=TRUE, X2>0, X1≠X2, and X2>1, after adding (X1, Y1) being contents of said first buffer to said packet mode list, substituting X2 for X1 and Y2 for Y1 respectively and thereafter substituting 1 for X2 and 1 for Y2;

in the case where N=1 is given, and said flag F gives F=TRUE, X2>0, X1≠X2, and X2≦1, after adding (X1, Y1) being contents of said first buffer to said packet mode list, substituting 0 for X2 and 0 for Y2 and thereafter substituting 1 for X1, 2 for Y1 and FALSE for F;

in the case where N≧2 is given, and said flag F gives F=FALSE, adding (X1, Y1) being contents of said first buffer to said packet mode list, in the case where N≧2 is given, and said flag F gives F=TRUE and X1=X2 is given, replacing Y1 with (Y+1) and thereafter adding (X1, Y1) being contents of said first buffer to said packet mode list;

in the case where N≧2 is given, and said flag F gives F=TRUE and X1≠X2 is given, adding (X1, Y1) being contents of said first buffer to said packet mode list, and thereafter moreover adding (X2, Y2) being contents of said second buffer to said packet mode list;

in the case where N≧2 is given, adding (0, N−1) to said packet mode list and thereafter substituting 1 for X1, 1 for Y1, 0 for X2, 0 for Y2 and FALSE for F respectively;

lastly for each item (K, L) of said packet mode list, in case of K≧1, constructing K units of said source packets as one unit of transmission packet data and arranging in series L units of said transmission packet data including K units of said source packets; and in case of K=0, with dummy data being said transmission packet, arranging in series L units of said dummy data.

A still additional aspect of the present invention is a program to cause a computer to execute all or a part of the steps, in the packet mode determining method of:

upon receipt of a source packet of T units for one pair (T≧1) constructed of a pair of data of the source packet data and a source packet header including a time stamp, of the packet mode determining method, all or a part of:

in the case where J units (J≧1) of said source packets are in safekeeping in a shunting buffer, adding a pair of (0, N0−1) to a packet mode list only when the kept difference number N0 is N0>1, and thereafter for a first buffer expressed by a pair of two units of numeric values being (X1, Y1), substituting J for X1 and 1 for Y1;

among M units of said source packets, storing into said shunting buffer all said source packets that have the same value as that in a predetermined portion of said time stamp of said source packet located in the last and that are brought into series with said source packet located in the last;

submitting the number of units of said source packets stored in said shunting buffer for J; and after substituting, for said kept difference number N0, difference between said time stamp of said source packet of the last among said source packets that are not stored in said shunting buffer and said time stamp of said source packet that is stored in said shunting buffer, substituting FALSE for a flag F expressed by TRUE or FALSE and checking M units of said source packets sequentially from the head;

calculating difference N between a value of said time stamp included in said source packet checked immediately prior thereto and a value of said time stamp included in said source packet checked this time;

in the case where N=0 is given, and the flag F expressed by TRUE or FALSE gives F=TRUE, and a first buffer expressed by a pair of two units of numeric values being (X1, Y1) fulfills X1=1 and Y1>1, after Y1 is replaced with (Y1−1), adding (X1, Y1) being contents of said first buffer to a packet mode list, and moreover substituting X1=2, Y1=1 for said first buffer;

in the case where N=0 is given, and said flag F is F=TRUE, and the first buffer expressed by a pair of two units of numeric values of (X1, Y1) is X1≠1 and/or Y1≦1, replacing X1 with (X1+1);

in the case where N=0 is given, and said flag F is F=TRUE, replacing X1 of the first buffer expressed by a pair of two units of numeric values of (X1, Y1) with (X1+1);

in the case where N=1, and said flag F is F=FALSE and X2≦1, substituting 1 for X1 and replacing Y1 with (Y1+1);

in the case where N=1, and said flag F is F=FALSE and X2>1, making said flag F constitute F=TRUE, and at the same time, substituting 1 for X2 and replacing Y2 with 1;

in the case where N=1, and said flag F is F=TRUE and X2=0, replacing Y1 with (Y1+1), and at the same time, substituting 1 for X2;

in the case where N=1, and said flag F is F=TRUE and X2>0 and X1=X2, replacing Y1 with (Y1+1), and at the same time, substituting 1 for X2 and 1 for Y2 respectively;

in the case where N=1, and said flag F gives F=TRUE, X2>0, X1≠X2, and X2>1, after adding (X1, Y1) being contents of said first buffer to said packet mode list, substituting X2 for X1 and Y2 for Y1 respectively and thereafter substituting 1 for X2 and 1 for Y2;

in the case where N=1 is given, and said flag F gives F=TRUE, X2>0, X1≠X2, and X2≦1, after adding (X1, Y1) being contents of said first buffer to said packet mode list, substituting 0 for X2 and 0 for Y2 and thereafter substituting 1 for X1, 2 for Y1 and FALSE for F;

in the case where N≧2 is given, and said flag F gives F=FALSE, adding (X1, Y1) being contents of said first buffer to said packet mode list;

in the case where N≧2 is given, and said flag F gives F=TRUE and X1=X2 is given, replacing Y1 with (Y+1) and thereafter adding (X1, Y1) being contents of said first buffer to said packet mode list;

in the case where N≧2 is given, and said flag F gives F=TRUE and X1≠X2 is given, adding (X1, Y1) being contents of said first buffer to said packet mode list, and thereafter moreover adding (X2, Y2) being contents of said second buffer to said packet mode list;

in the case where N≧2 is given, arranging to add (0, N−1) to said packet mode list and thereafter substituting 1 for X1, 1 for Y1, 0 for X2, 0 for Y2 and FALSE for F respectively; and after checking on all (T-J) units of said source packets coming to an end;

in the case where said flag F is F=FALSE, a step to add (X1, Y1) being contents of said first buffer to said packet mode list;

in the case where said flag F gives F=TRUE and X1=X2, after Y1 is replaced with (Y1+1), adding (X1, Y1) being contents of said first buffer to said packet mode list;

in the case where said flag F gives F=TRUE and X1≠X2, adding (X1, Y1) being contents of said first buffer to said packet mode list, and moreover adding (X2, Y2) being contents of said second buffer to said packet mode list;

lastly for each item (K, L) of said packet mode list, in case of K≧1, constructing K units of said source packets as one unit of transmission packet data and arranging in series L units of said transmission packet data including K units of said source packets; and in case of K=0, with dummy data being said transmission packet, arranging in series L units of said dummy data.

A yet additional aspect of the present invention is a program to cause a computer to execute all or a part of the steps, in the packet mode determining method, of:

upon receipt of a source packet constructed of a pair of data of the source packet data and a source packet header including a time stamp, calculating difference N between a value of said time stamp included in said source packet received immediately prior thereto and a value of the time stamp included in said source packet received this time;

in the case where said N gives N>(A+1), outputting (N−A−1) units of dummy packets, and thereafter splitting said source packet received this time into M units and outputting them, and at the same time substituting (M−1) for A;

in the case where said N does not give N>(A+1), splitting said source packet received this time into M units and outputting them, and at the same time substituting (M−N) for A.

A still yet additional aspect of the present invention is a medium capable of being processed by a computer that bears a program to cause a computer to execute all or a part of the steps, in the packet mode determining method, of:

upon receipt of a source packet constructed of a pair of data of the source packet data and a source packet header including a time stamp, substituting FALSE for a flag F expressed by TRUE or FALSE, and at the same time, calculating difference N between a value of said time stamp included in said source packet received immediately prior thereto and a value of the time stamp included in said source packet received this time;

in the case where N=0 is given, and the flag F expressed by TRUE or FALSE, gives F=TRUE, and a first buffer expressed by a pair of two units of numeric values being (X1, Y1) fulfills X1=1 and Y1>1, after Y1 is replaced with (Y1−1) adding (X1, Y1) being contents of said first buffer to a packet mode list, and moreover substituting X1=2, Y1=1 for said first buffer;

in the case where N=0 is given, and said flag F is F=TRUE, and the first buffer expressed by a pair of two units of numeric values of (X1, Y1) is X1≠1 and/or Y1≦1, replacing X1 with (X1+1);

in the case where N=0 is given, and said flag F is F=TRUE, replacing X1 of the first buffer expressed by a pair of two units of numeric values (X1, Y1) with (X1+1);

in the case where N=1, and said flag F is F=FALSE and X2≦1, substituting 1 for X1 and replacing Y1 with (Y1+1);

in the case where N=1, and said flag F is F=FALSE and X2>1, making said flag F constitute F=TRUE and, at the same time, substituting 1 for X2 and 1 for Y2;

in the case where N=1, and said flag F is F=TRUE and X2=0, replacing Y1 with (Y1+1) and, at the same time, substituting 1 for X2;

in the case where N=1, and said flag F is F=TRUE and X2>0 and X1=X2, replacing Y1 with (Y1+1) and, at the same time, substituting 1 for X2 and 1 for Y2 respectively;

in the case where N=1, and said flag F gives F=TRUE, X2>0, X1≠X2, and X2>1, after adding (X1, Y1) being contents of said first buffer to said packet mode list, substituting X2 for X1 and Y2 for Y1 respectively and thereafter substituting 1 for X2 and 1 for Y2;

in the case where N=1 is given, and said flag F gives F=TRUE, X2>0, X1≠X2, and X2≦1, after adding (X1, Y1) being contents of said first buffer to said packet mode list, substituting 0 for X2 and 0 for Y2 and thereafter substituting 1 for X1, 2 for Y1 and FALSE for F;

in the case where N≧2 is given, and said flag F gives F=FALSE, adding (X1, Y1) being contents of said first buffer to said packet mode list;

in the case where N≧2 is given, and said flag F gives F=TRUE and X1=X2 is given, replacing Y1 with (Y+1) and thereafter adding (X1, Y1) being contents of said first buffer to said packet mode list;

in the case where N≧2 is given, and said flag F gives F=TRUE and X1≠X2 is given, adding (X1, Y1) being contents of said first buffer to said packet mode list, and thereafter moreover adding (X2, Y2) being contents of said second buffer to said packet mode list;

in the case where N≧2 is given, adding (0, N−1) to said packet mode list and thereafter substituting 1 for X1, 1 for Y1, 0 for X2, 0 for Y2 and FALSE for F respectively;

lastly for each item (K, L) of said packet mode list, in case of K≧1, constructing K units of said source packets as one unit of transmission packet data and arranging in series L units of said transmission packet data including K units of said source packets; and in case of K=0, with dummy data being said transmission packet, arranging in series L units of said dummy data.

A supplementary aspect of the present invention is a medium capable of being processed by a computer that bears a program to cause a computer to execute all or a part of the steps, in the packet mode determining method of: upon receipt of a source packet of T units for one pair (T≧1) constructed of a pair of data of the source packet data and a source packet header including a time stamp, in the case where J units (J≧1) of said source packets are in safekeeping in a shunting buffer, adding a pair of (0, N0−1) to a packet mode list only when the kept difference number N0 is N0>1, and thereafter for a first buffer expressed by a pair of two units of numeric values being (X1, Y1), substituting J for X1 and 1 for Y1;

among M units of said source packets, storing into said shunting buffer all said source packets that have the same value as that in a predetermined portion of said time stamp of said source packet located in the last and that are brought into series with said source packet located in the last;

substituting the number of units of said source packets stored in said shunting buffer for J;

after substituting, for said kept difference number N0, difference between said time stamp of said source packet of the last among said source packets that are not stored in said shunting buffer and said time stamp of said source packet that is stored in said shunting buffer;

substituting FALSE for a flag F expressed by TRUE or FALSE and checking M units of said source packets sequentially from the head;

calculating difference N between a value of said time stamp included in said source packet checked immediately prior thereto and a value of said time stamp included in said source packet checked this time;

in the case where N=0 is given, and the flag F expressed by TRUE or FALSE gives F=TRUE, and a first buffer expressed by a pair of two units of numeric values being (X1, Y1) fulfills X1=1 and Y1>1, after Y1 is replaced with (Y1−1) adding (X1, Y1) being contents of said first buffer to a packet mode list, and moreover substitute X1=2, Y1=1 for said first buffer;

in the case where N=0 is given, and said flag F is F=TRUE, and the first buffer expressed by a pair of two units of numeric values of (X1, Y1) is X1≠1 and/or Y1≦1, replacing X1 with (X1+1)

in the case where N=0 is given, and said flag F is F=TRUE, replacing X1 of the first buffer expressed by a pair of two units of numeric values of (X1, Y1) with (X1+1);

in the case where N=1, and said flag F is F=FALSE and X2≦1, substituting 1 for X1 and replacing Y1 with (Y1+1);

in the case where N=1, and said flag F is F=FALSE and X2>1, a step to make said flag F constitute F=TRUE and, at the same time, substituting 1 for X2 and 1 for Y2;

in the case where N=1, and said flag F is F=TRUE and X2=0, replacing Y1 with (Y1+1) and, at the same time, substituting 1 for X2;

in the case where N=1, and said flag F is F=TRUE and X2>0 and X1=X2, replacing Y1 with (Y1+1) and, at the same time, substituting 1 for X2 and 1 for Y2 respectively;

in the case where N=1, and said flag F gives F=TRUE, X2>0, X1≠X2, and X2>1, after adding (X1, Y1) being contents of said first buffer to said packet mode list, substituting X2 for X1 and Y2 for Y1 respectively and thereafter substituting 1 for X2 and 1 for Y2;

in the case where N=1 is given, and said flag F gives F=TRUE, X2>0, X1≠X2, and X2≦1, after adding (X1, Y1) being contents of said first buffer to said packet mode list, substituting 0 for X2 and 0 for Y2 and thereafter substituting 1 for X1, 2 for Y1 and FALSE for F;

in the case where N≧2 is given, and said flag F gives F=FALSE, (X1, Y1) being contents of said first buffer to said packet mode list, adding (X1, Y1) being contents of said first buffer to said packet mode list;

in the case where N≧2 is given, and said flag F gives F=TRUE and X1=X2 is given, replacing Y1 with (Y+1) and thereafter adding (X1, Y1) being contents of said first buffer to said packet mode list;

in the case where N≧2 is given, and said flag F gives F=TRUE and X1≠X2 is given, adding (X1, Y1) being contents of said first buffer to said packet mode list, and thereafter moreover adding (X2, Y2) being contents of said second buffer to said packet mode list;

in the case where N≧2 is given, arranging to add (0, N−1) to said packet mode list and thereafter substituting 1 for X1, 1 for Y1, 0 for X2, 0 for Y2 and FALSE for F respectively; and after checking on all (T−J) units of said source packets coming to an end, in the case where said flag F is F=FALSE, adding (X1, Y1) being contents of said first buffer to said packet mode list;

in the case where said flag F gives F=TRUE and X1=X2, after Y1 is replaced with (Y1+1), adding (X1, Y1) being contents of said first buffer to said packet mode list;

in the case where said flag F gives F=TRUE and X1≠X2, adding (X1, Y1) being contents of said first buffer to said packet mode list, and moreover adding (X2, Y2) being contents of said second buffer to said packet mode list;

lastly for each item (K, L) of said packet mode list, in case of K≧1, constructing K units of said source packets as one unit of transmission packet data and arranging in series L units of said transmission packet data including K units of said source packets; and in case of K=0, with dummy data being said transmission packet, arranging in series L units of said dummy data.

A still supplementary aspect of the present invention is a medium capable of being processed by a computer that bears a program to cause a computer to execute all or a part of the steps, in the packet mode determining method, of:

upon in receipt of a source packet constructed of a pair of data of the source packet data and a source packet header including a time stamp, calculating difference N between a value of said time stamp included in said source packet received immediately prior thereto and a value of the time stamp included in said source packet received this time;

in the case where said N gives N>(A+1), outputting (N−A−1) units of dummy packets, and thereafter splitting said source packet received this time into M units and outputting them, and at the same time substituting (M−1) for A;

in the case where said N does not give N>(A+1), splitting said source packet received this time into M units and outputting them, and at the same time substituting (M−N) for A.

A yet supplementary aspect of the present invention is a transmitting method for transmitting a source packet constructed of a pair of data of a source packet data and a source packet header including a time stamp, comprising:

a step of investigating values of a predetermined portion of said time stamp included in said source packet when said source packet is inputted, unifying said source packets that have a same value for said predetermined portion and are inputted in series to output as one unit of transmission packet data; and a step of producing a transmission packet by adding predetermined additional information to said outputted transmission packet data and outputting said produced transmission packet outward.

A still yet supplementary aspect of the present invention is a transmitting method for transmitting a source packet constructed of a pair of data of the source packet data and a source packet header including a time stamp, comprising:

a step of split number designating means of designating a split number M (M≧1) to split said source packet;

a step of investigating values of a predetermined portion of said time stamp included in said source packet when said source packet is inputted, outputting said M units split from said source packet as transmission packet data when difference between values of predetermined portions of said time stamp included in said two source packets in series is N(N≧0) being N≦L(L≧1), and outputting (N−L) units of dummy transmission packet data when difference between values of said predetermined portions of said time stamp is N being N>L; and a step of outputting as transmission packet outward those being said outputted transmission packet data and/or said dummy transmission packet data to which a predetermined additional information is added.

Another aspect of the present invention is a source packet generating method, comprising:

a step of generating a data packet transmitted in a first clock, and determining transmission timing of said data packet expressed in said first clock; and a step of converting said transmission timing to time information on a time axis expressed in a second clock, adding to said data packet the time stamp with a value determined based on all or a part of said time information and outputting a data packet to which the time stamp is added as a source packet;

wherein outputted said source packet is converted into a packet for transmission based on the value of that added time stamp is outputted from an interface.

BRIEF DESCRIPTION OF THE DRAWINGS

FIG. 1 is a drawing showing a construction of a source packet for transmitting an MPEG2 TS packet in IEC61883.
FIG. 2 is a drawing showing a construction of a source packet header 102.
FIG. 3 is a drawing showing an example of a construction of a CIP.
FIG. 4 is a drawing showing a construction of isochronous packet for transmitting CIP data 302.
FIG. 5 is a conceptional view of transmission timing of TS packets 101.
FIG. 6 is a drawing showing a construction of CTR in IEEE1394.
FIG. 7 is a drawing showing an example of transmitting apparatus in a first Embodiment of the present invention.
FIG. 8 is a drawing showing an example of a construction of data file stored in a hard disk 704.
FIG. 9 is a drawing showing an example of source packet data read out from a hard disk 706.
FIG. 10 is a drawing showing a construction of CIP data produced from the source packet data in FIG. 9.
FIG. 11 is a flowchart showing operations of a time stamp sample judging part 705 in a second Embodiment of the present invention.
FIG. 12 is a flowchart showing operations of a time stamp sample judging part 705 in the second Embodiment of the present invention.

FIG. 13 is a flowchart showing operations of a time stamp sample judging part 705 in the second Embodiment of the present invention.

FIG. 14 is a drawing showing an example of output results of transmission packet mode list 1101 in the second Embodiment of the present invention.

FIG. 15 is a flowchart showing operations of a time stamp sample judging part 705 in a third Embodiment of the present invention.

FIG. 16 is a drawing showing an example of output results of transmission packet mode list 1101 in the third Embodiment of the present invention.

FIG. 17 is a drawing showing an example of output results of transmission packet mode list 1101 in the third Embodiment of the present invention.

FIG. 18 is a drawing showing an example of transmitting apparatus in a fourth Embodiment of the present invention.

FIG. 19 is a drawing showing an example of a splitting method of a source packet 103*a*.

FIG. 20 is a drawing showing an example of a source packet data read out from a hard disk 706.

FIG. 21 is a drawing showing a construction of CIP data produced from source packet data in FIG. 18.

FIG. 22 is a flowchart showing operations of a time stamp sample judging part 1604 in a fifth Embodiment of the present invention.

FIG. 23 is a drawing showing an example of output results of transmission packet mode list 1101 in the fifth Embodiment of the present invention.

FIG. 24 is a drawing showing an example of a source packet generating apparatus in a sixth Embodiment.

FIG. 25 is a drawing showing an example of a generating method of a time stamp 201.

[FIG. 26]

FIG. 26 is a drawing showing an example of a source packet generating apparatus in a seventh Embodiment.

DESCRIPTION OF SYMBOLS

Figure 1:
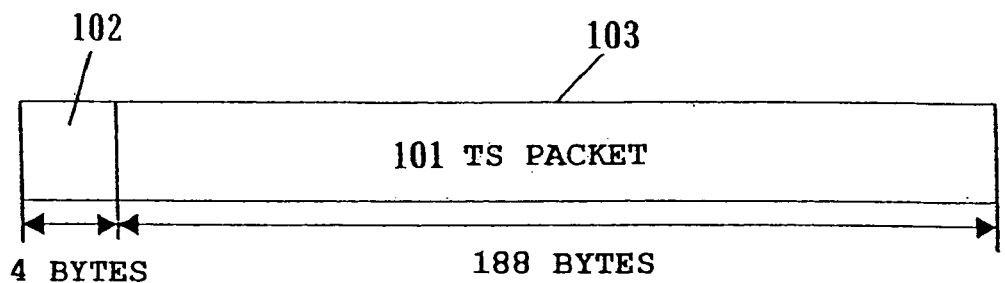
[FIG. 1]
Figure 2:
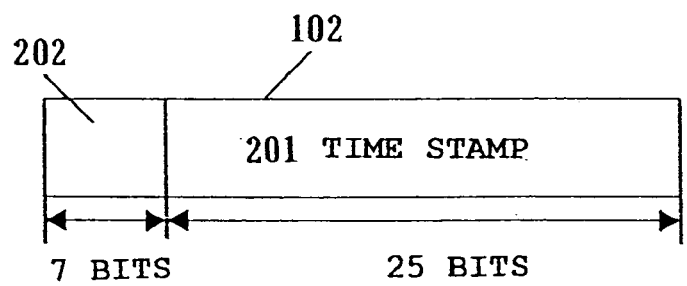
[FIG. 2]
Figure 3:
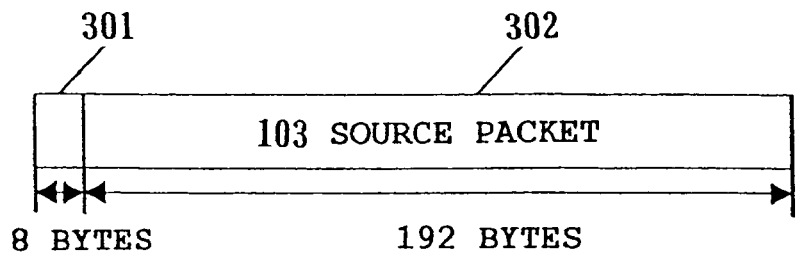
[FIG. 3]

101 . . . TS packet
102 . . . source packet header
103 . . . source packet
201 . . . time stamp
202 . . . spare information
301 . . . CIP header
302 . . . CIP data
401 . . . isochronous packet
402 . . . isochronous header
403 . . . header CRC
404 . . . data CRC
601 . . . CTR
701 . . . PC
702 . . . IEEE1394 interface
703 . . . CIP producing part
704 . . . data reading part
705 . . . time stamp sample judging part
706 . . . hard disk
707 . . . IEEE1394 bus
708 . . . receiving apparatus
801 . . . header
802 . . . trailer
1101 . . . transmission packet mode list
1301 . . . buffer for final difference value
1302 . . . shunting buffer
1601 . . . PC
1601 . . . PC
1602 . . . CIP producing part
1603 . . . split number designating part
1604 . . . time stamp sample judging part
1701*a*1, 1701*a*2 . . . split block
2401 . . . time stamp adding part
2402 . . . TS packet generating part
2403 . . . data reading part
2404 . . . transmitting part
2405 . . . hard disk
2406 . . . PC
2407 . . . time information
2408 . . . PS packet
2601 . . . buffer
2602 . . . transmitting part

PREFERRED EMBODIMENTS OF THE INVENTION

Embodiments of the present invention will be described with reference to drawings as follows.

First Embodiment

A first Embodiment of the present invention will be described with reference to FIGS. 7 to 10 as follows.

Figure 7:
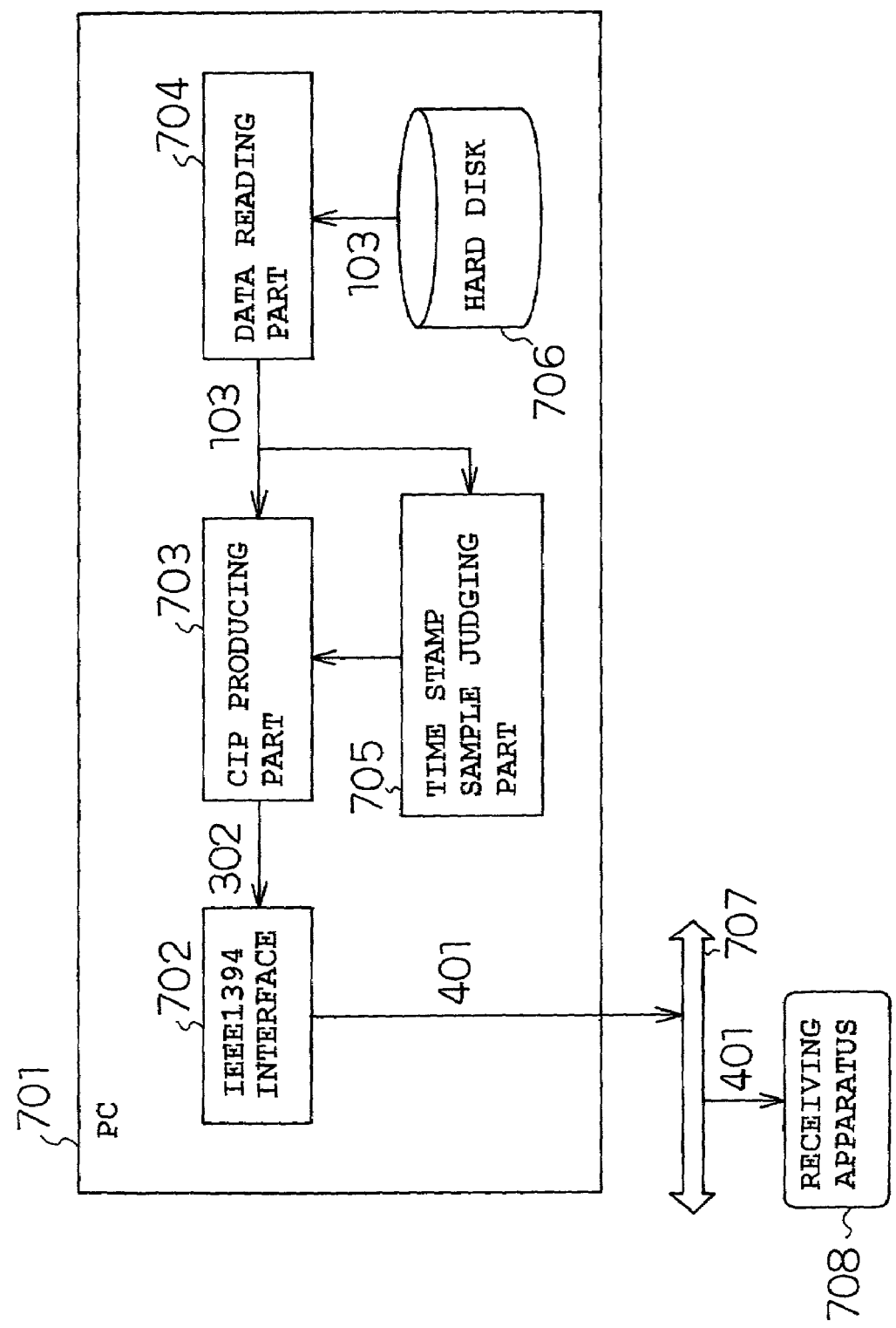
[FIG. 7]

FIG. 7 is an example of a transmitting apparatus. In FIG. 7, reference numeral 701 denotes a PC, reference numeral 702 denotes an IEEE1394 interface, reference numeral 703 denotes a CIP producing part, reference numeral 704 denotes a data reading part, reference numeral 705 denotes a time stamp sample judging part, reference numeral 706 denotes a hard disk, reference numeral 707 denotes an IEEE1394 bus and reference numeral 708 denotes a receiving apparatus.

Figure 8:
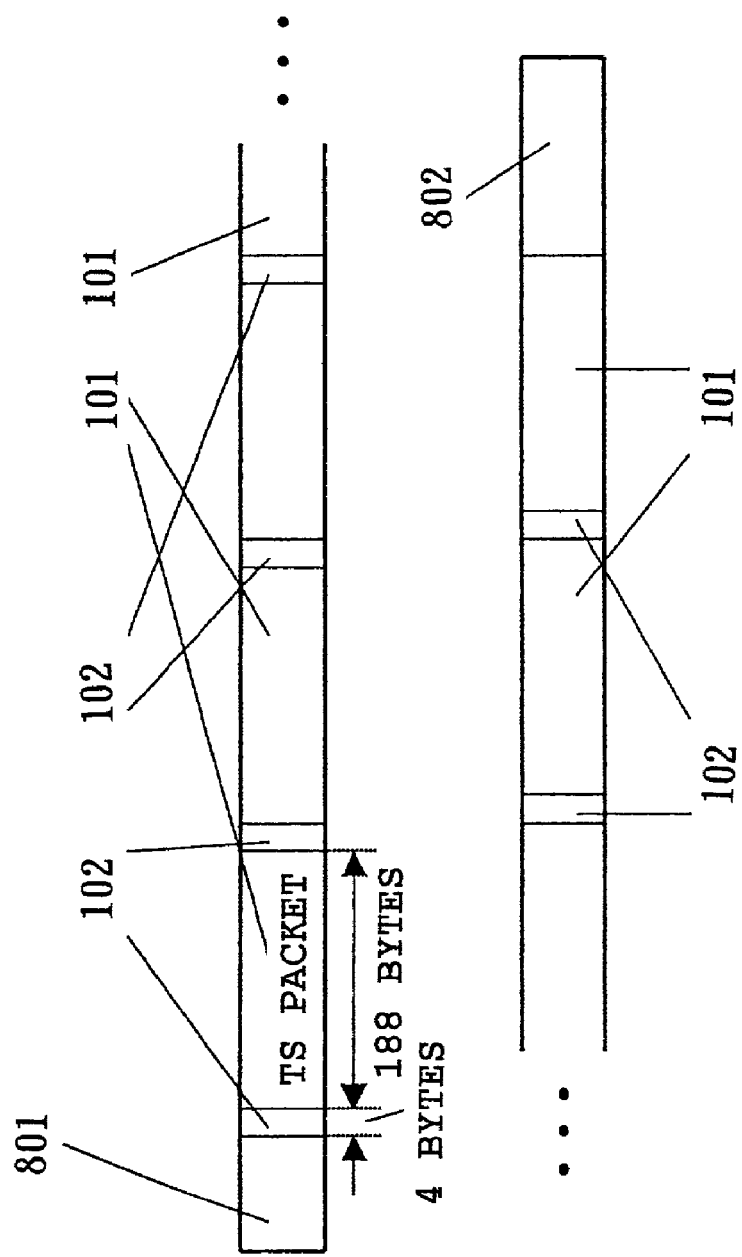
[FIG. 8]

FIG. 8 is an example of record format of TS packets 101 in the hard disk 706. In FIG. 8, reference numeral 801 denotes a header and reference numeral 802 denotes a trailer.

Figure 9:
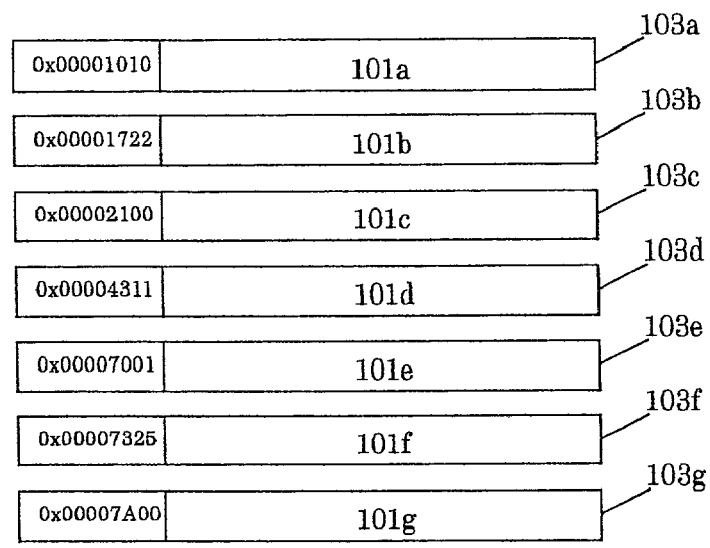
[FIG. 9]

FIG. 9 is an example of source packet data read out from the hard disk 706.

Figure 10:
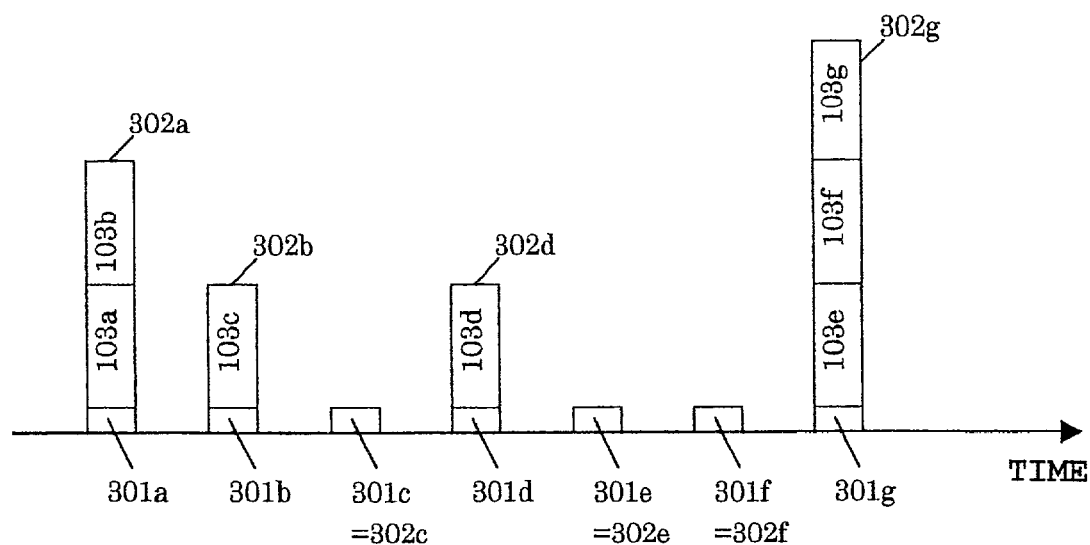
[FIG. 10]

FIG. 10 is a construction of a CIP produced from the source packet data in FIG. 9.

Incidentally, the PC 701 of the present embodiment is an example of the transmitting apparatus of the present invention.

Now, operations of the PC 701 will be described.

At first in the hard disk 706, TS packet data are stored in a format as in FIG. 8. That is, in the hard disk 706, a time stamp that the transmitting party of the TS packet data has added is stored together with the TS packet data.

The data reading part 704 reads out the source packet 103, that is, a pair of a source packet header 102 and a TS packet 101 from the hard disk 706 so as to output to the CIP producing part 703 and the time stamp sample judging part 705.

The time stamp sample judging part 705 extracts the time stamp 201 from the received source packet header 102, notifies the CIP producing part 703 which source packets 103 have the same value as the Cycle_Count of the time stamp 201 and is brought into connection in series, and instructs those source packets to get together to construct one CIP data.

For example, in case of FIG. 9, it detects that the source packet 103a and the source packet 103b have the same Cycle_Count and are brought into connection in series and sends out an instruction to the CIP producing part 703.

The CIP producing part 703 produces CIP data 302 from the received source packet 103 and outputs CIP data 302 to an IEEE1394 interface 702 according to the method that has been described in the prior arts.

For example, it connects the source packet 103a with the source packet 103b and adds a CIP header 301a to the head thereof to be outputted to the IEEE1394 interface 702 as CIP data 302a.

In addition, the time stamp sample judging part 705 compares the Cycle_Count of the extracted time stamp 201 and the Cycle_Count of the time stamp 201 included in the immediately prior source packet 103 and instructs 703 to insert (N−1) units of Empty packets between those source packets in the case where the difference N between both the parties is 2 or more.

The CIP producing party 703 receives an instruction to insert the Empty packet, and then produces the CIP data 302 constructed only of the CIP header 301 to output them to the IEEE1394 interface 702.

For example, in case of FIG. 9, the difference between the Cycle_Count of the time stamp included in the source packet 103c and the Cycle_Count of the time stamp included in the source packet 103d is 2, and therefore the CIP producing part 703 is instructed to insert one Empty packet between those source packets.

Figure 4:
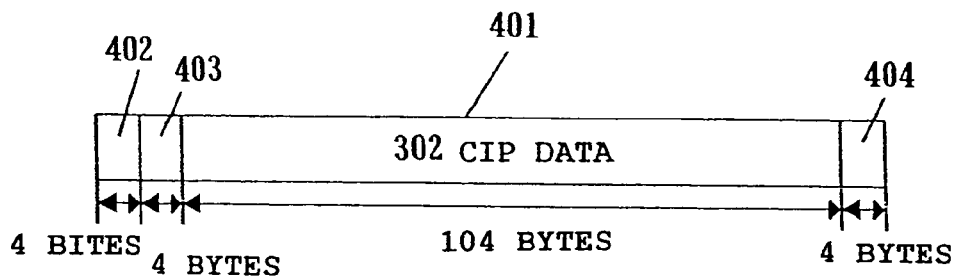
[FIG. 4]
Figure 5:
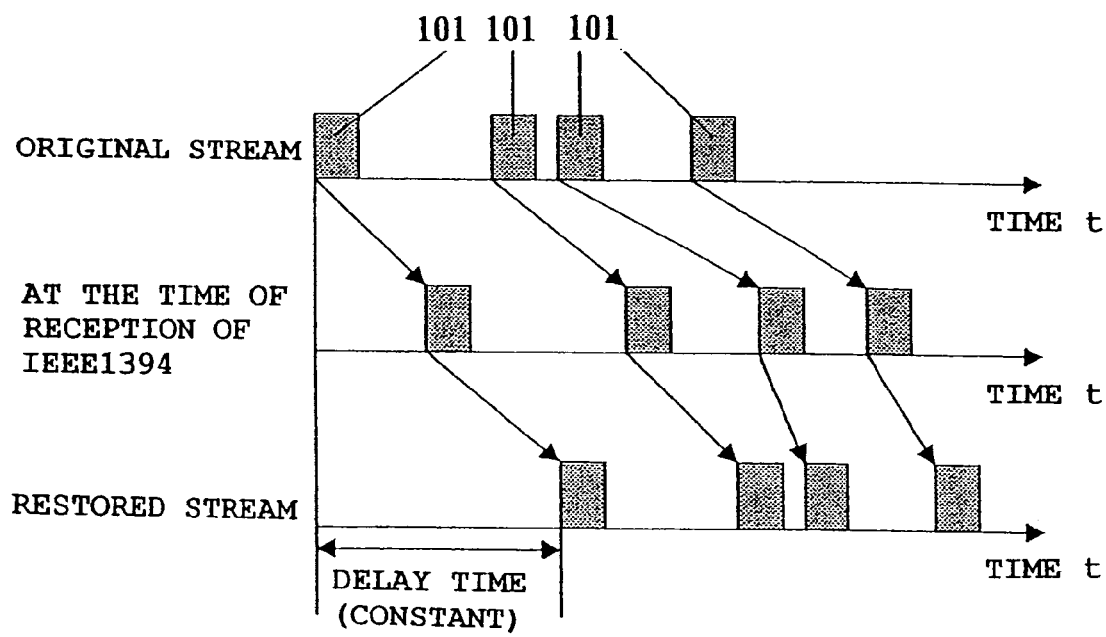
[FIG. 5]
Figure 6:
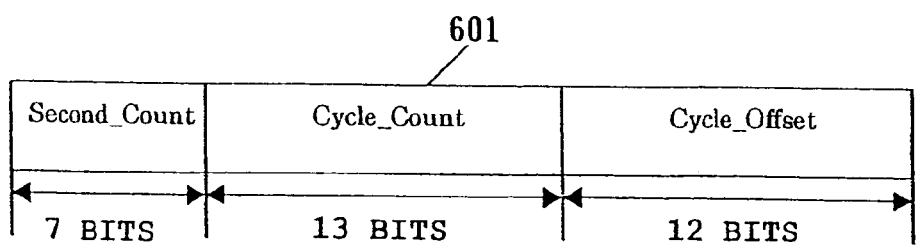
[FIG. 6]

The IEEE1394 interface 702 adds an isochronous header 402, a header CRC 403 and data CRC 404 to the received CIP data 302 as in FIG. 4 so as to create isochronous packet 401 for an output to an IEEE1394 bus 707.

The outputted isochronous packet 401 is received, for example, by the receiving apparatus 708.

As described so far, the isochronous packet 401 is constructed from the TS packet data stored in the hard disk 706 and can be outputted to the IEEE1394 bus 707.

Incidentally, the source packet 103 has been taken as the one stored in the hard disk 706, but a pair of the TS packet 101 and the time stamp 201 will do as well or another time information created from the time stamp 201 instead of the time stamp 201 will do as well. In this case, the time stamp 201 as well as the source packet header 102 are produced in the data reading part 704.

In addition, the data file on the hard disk 704 may be stored in an AVI file format, an ASF file format, or a QuickTime file format, or may not store additional information such as a header and a trailer.

In addition, the source packet header 102 and the TS packet 101 may not be stored in order as in FIG. 8.

In addition, the data to be transmitted are not limited to a MPEG2 TS packet, but a source packet including a source packet header will do.

In addition, those outputting the source packet are not limited to a hard disk, but may be another recording apparatus, and an apparatus converting the MPEG2 data other than the TS packet format into the TS packet format will do as well.

In addition, a part of or the whole transmitting apparatus may be constructed of softwares, or the transmitting apparatus may not be a PC.

Second Embodiment

An example of operations of the time stamp sample judging part 705 in the first Embodiment of the present invention will be described as a second Embodiment of the present invention with reference to FIGS. 11 to 14 as follows.

Figure 11:
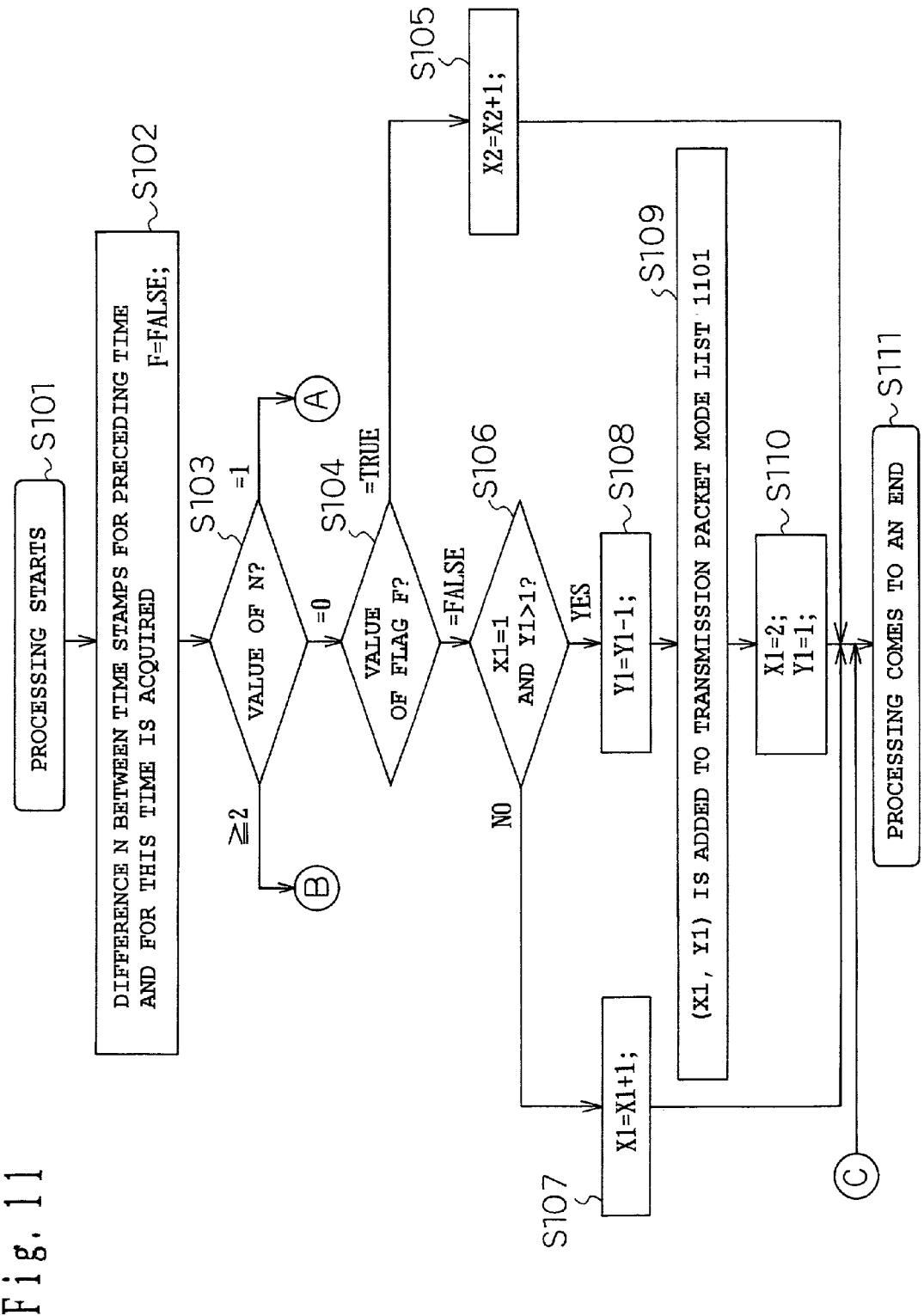
[FIG. 11]
Figure 12:
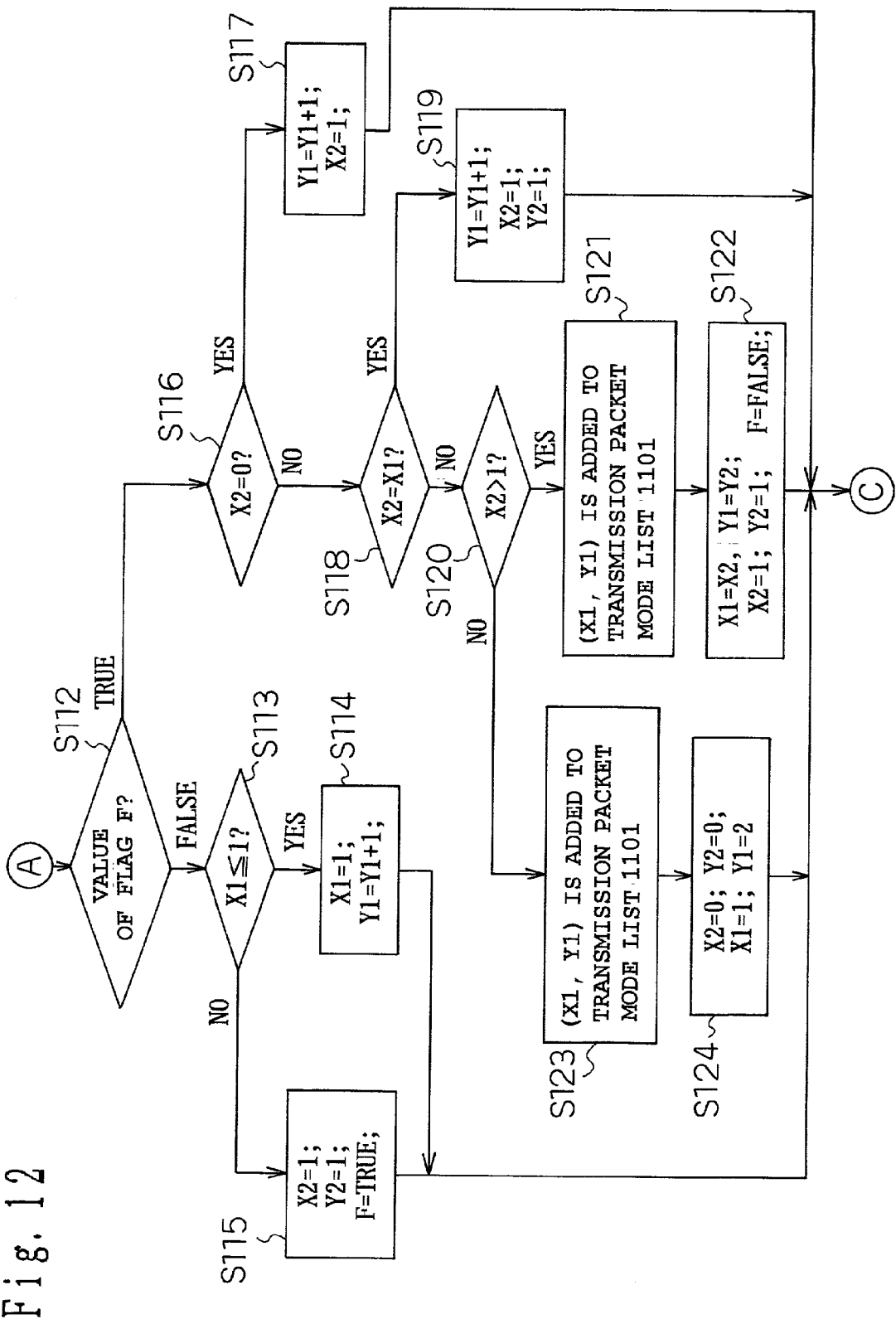
[FIG. 12]
Figure 13:
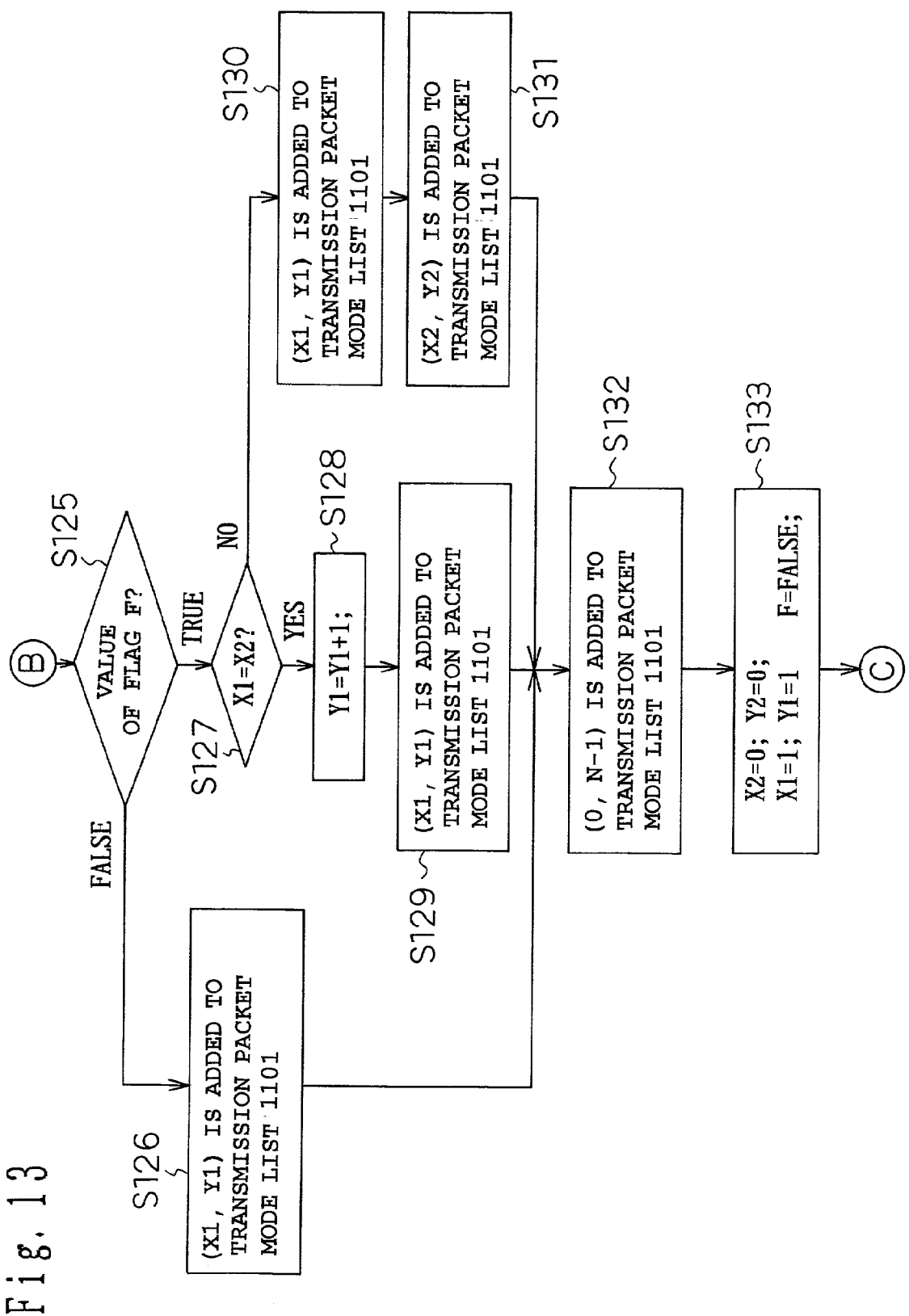
[FIG. 13]

FIGS. 11 to 13 are flowcharts describing operations of the time stamp sample judging part 705. In FIGS. 11 to 13, reference numeral 1101 denotes a transmission packet mode list.

Figure 14:
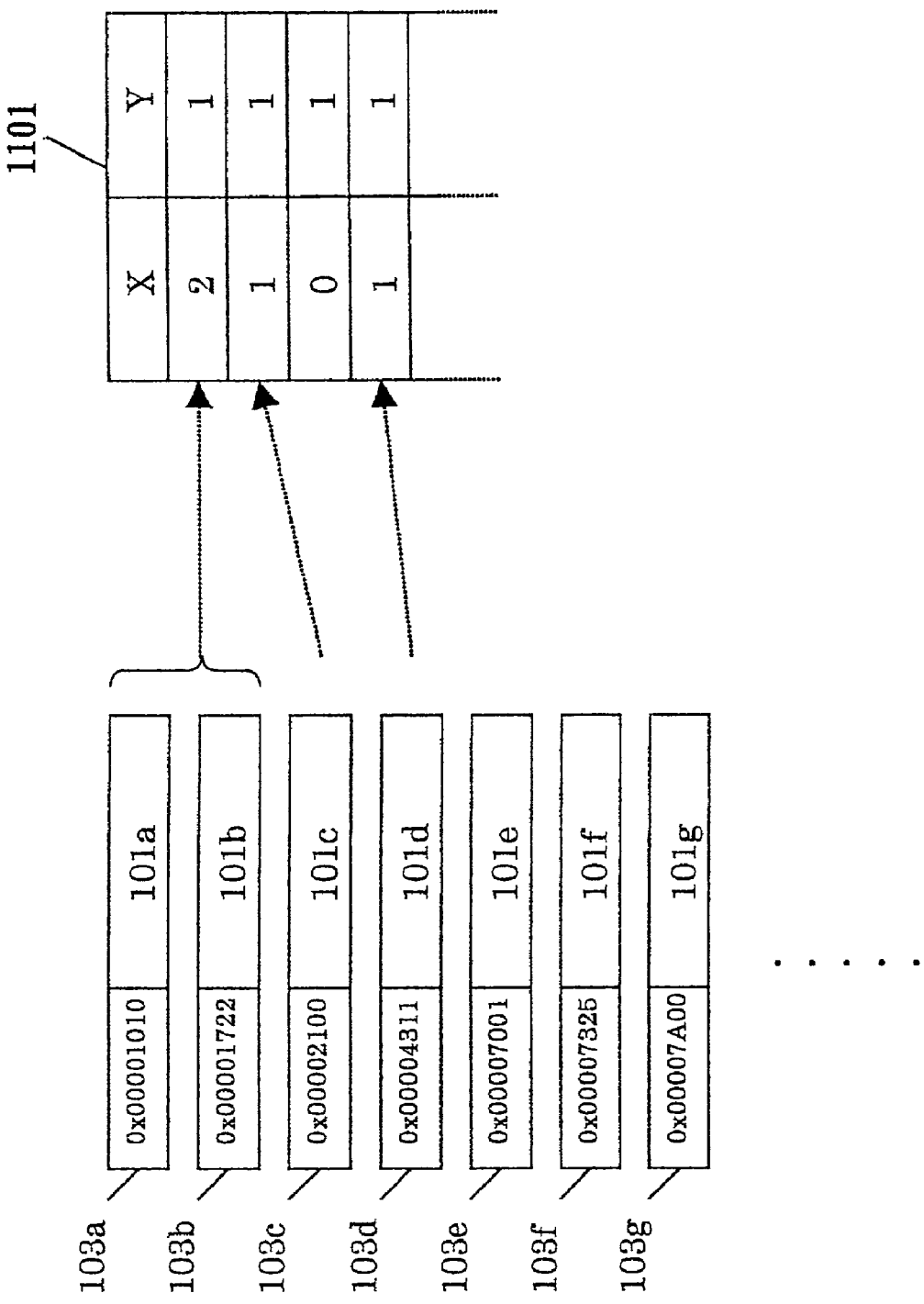
[FIG. 14]

FIG. 14 exemplifies output results of the transmission packet mode list 1101.

Here, the transmission packet mode list 1101 is a list of numeric values of a pair consisting of two units being (X, Y), wherein reference character X denotes the number of units of source packets 103 constructing one CIP data 302 while reference character Y denotes how many CIP data 302 constructed of X units of source packets 103 are arranged in series respectively. X=0 means an Empty packet.

With the above described mode list 1101 being produced, the time stamp sample judging part 705 operates as described in the first Embodiment.

In addition, in FIGS. 11 to 13, the description "X1=1;" means that 1 is substituted for X1.

Operations of the time stamp sample judging part 705 will be described as follows.

As an initial state prior to receipt of the source packet 103, X1=1, Y1=0, X2=0 and Y2=0 shall be adopted for substitution.

At first, upon receipt of the source packet 103, processing starts in Step 101, a time stamp of the source packet received immediately prior thereto in Step 102 and the time stamp of the source packet received this time are extracted so that the difference N between their respective Cycle_Count values is acquired. In case of the initially received source packet, N=1 shall be taken. At the same time as this, FALSE is substituted for a flag F.

In Step 103, a value of N is judged and in case of N=0, the step goes forward to Step 104, in case of N=1, to Step 112 and in case of N≧2, to Step 125.

Moreover, in Step 104, the value of the flag F is judged and in case of F=TRUE, the step goes forward to Step 105 while in case of F=FALSE, the step goes forward to Step 106.

In Step 105, X2+1 is substituted for X2 so that the step goes forward to Step 111.

In Step 106, the values of X1 and Y1 are judged, and in case of X=1 and Y1>1, the step goes forward to Step 108, and otherwise the step goes forward to Step 107.

In Step 107, X1+1 is substituted for X1 and the step goes forward to Step 111.

In Step 108, Y1−1 is substituted for Y1, and (X1, Y1) is added to the transmission packet mode list 1101 in Step 109 so that 2 is substituted for. X1 and 1 is for Y1 in Step 110 respectively and the step goes forward to Step 111.

In addition, in Step 112, judging the value of the flag F, the step goes forward to Step 113 in case of F=FALSE while the step goes forward to Step 116 in case of F=TRUE.

Moreover, in Step 113, the value of X1 is judged, and in case of X1≦1, the step goes forward to Step 114, and otherwise the step goes forward to Step 115.

In Step 114, 1 is substituted for X1 and Y1+1 is for Y1, and the step goes forward to Step 111.

In Step 115, 1 is substituted for X2, 1 is for Y2 and TRUE is for F and the step goes forward to Step 111.

In Step 116, the value of X2 is judged, and in case of X2=0, the step goes forward to Step 117, and otherwise the step goes forward to Step 118.

In Step 117, Y1+1 is substituted for Y1 and 1 is for X2 and the step goes forward to Step 111.

In Step 118, the values of X2 and X1 are brought into comparison so that in case of X1=X2, the step goes forward to Step 119 and otherwise the step goes forward to Step 120.

In Step 119, Y1+1 is substituted for Y1, 1 is for X2 and 1 is for Y2 so that the step goes forward to Step 111.

In Step 120, the value of X2 is judged, and in case of X2>1, the step goes forward to Step 121, and otherwise the step goes forward to Step 123.

In Step 121, (X1, Y1) is added to the transmission packet mode list 1101 and in Step 122, X2 is substituted for X1 and Y2 is for Y1 respectively, and thereafter 1 is substituted for X2 and 1 is for Y2 respectively so that the step goes forward to Step 111.

In Step 123, (X1, Y1) is added to the transmission packet mode list 1101 and in Step 124, 1 is substituted for X1, 2 is for Y1, 0 is for X2 and 0 is for Y2 respectively so that the step goes forward to Step 111.

In addition, in Step 125, judging the value of the flag F, the step goes forward to Step 126 in case of F=FALSE while the step goes forward to Step 127 in case of F=TRUE.

In Step 126, (X1, Y1) is added to the transmission packet mode list 1101 and the step goes forward to Step 132.

Moreover, in Step 127, the values of X2 and X1 are brought into comparison so that in case of X1=X2, the step goes forward to Step 128 and otherwise the step goes forward to Step 130.

In Step 128, Y1+1 is substituted for Y1 and (X1, Y1) is added to the transmission packet mode list 1101 in Step 129 so that the step goes forward to Step 132.

In Step 130, (X1, Y1) is added to the transmission packet mode list 1101 while (X2, Y2) is added to the transmission packet mode list 1101 in Step 131 so that the step goes forward to Step 132.

In Step 132, (0, N−1) is added to the transmission packet mode list 1101 while 1 is substituted for X1, 1 is for Y1, 0 is for X2 and 0 is for Y2 respectively in Step 133 so that the step goes forward to Step 111.

Lastly, the processing comes to an end in Step 111.

Output results of the transmission packet mode list 1101 at the time when the processing as described so far has been executed on the source packet as in FIG. 9 will be expressed in FIG. 14. The CIP data 302 will be constructed based on this transmission packet mode list 1101 as in FIG. 10.

Incidentally, conditional alternatives as Step 103 do not necessarily have to proceed in this order, but any one will do if conditions to be fulfilled to reach each Step lastly are the same as those in FIGS. 11 to 13.

In addition, apart of or the whole of each Step in FIGS. 11 to 13 may be constructed of softwares.

Third Embodiment

Another example of operations of the time stamp sample judging part 705 in the first Embodiment of the present invention will be described as a third embodiment of the present invention with reference to FIGS. 15 to 17 as follows.

Figure 15:
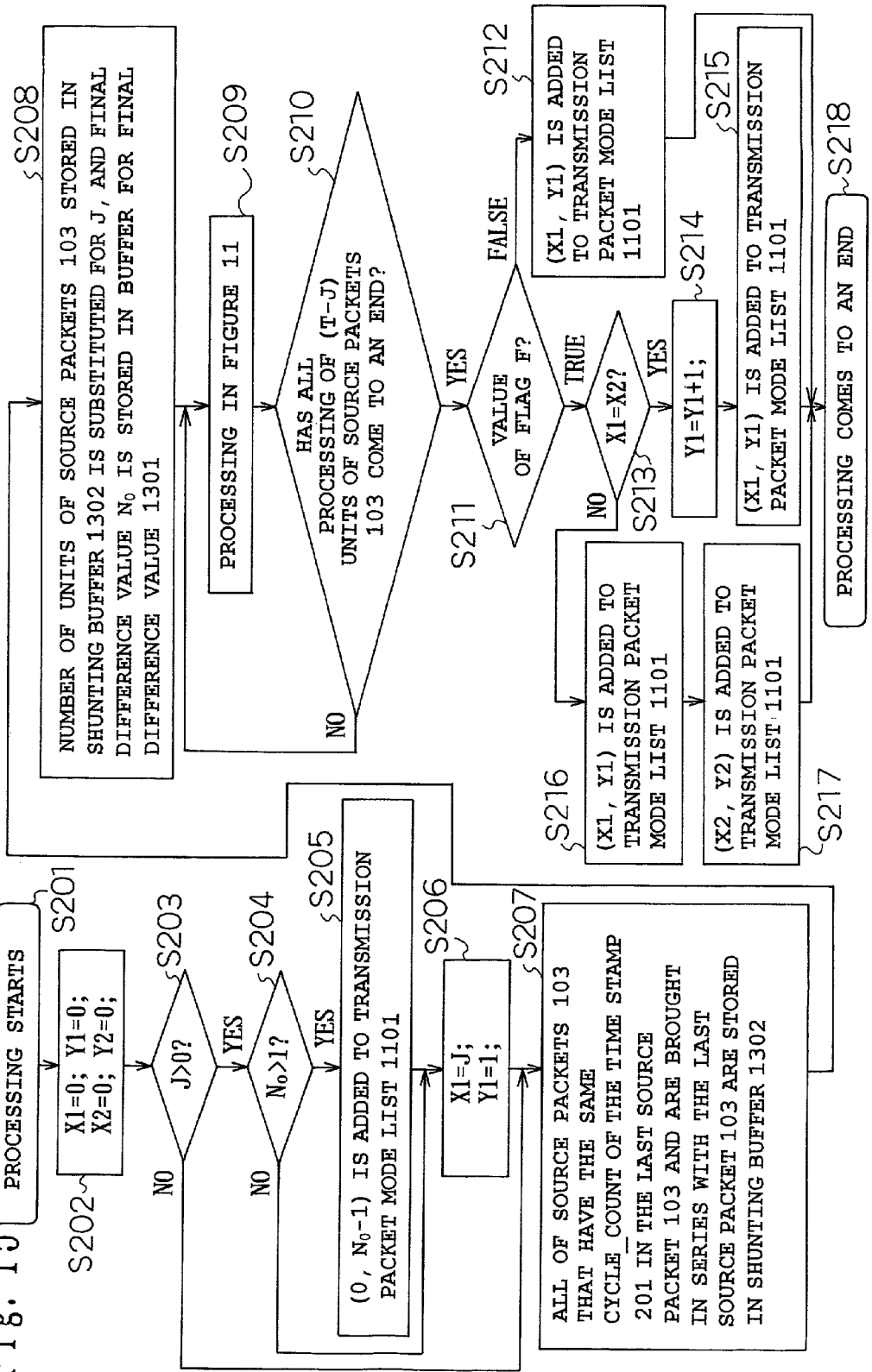
[FIG. 15]

FIG. 15 is a flowchart describing operations of the time stamp sample judging part 705. In FIG. 15, reference numeral 1301 denotes a buffer for final difference value and reference numeral 1302 denotes a shunting buffer.

Figure 16:
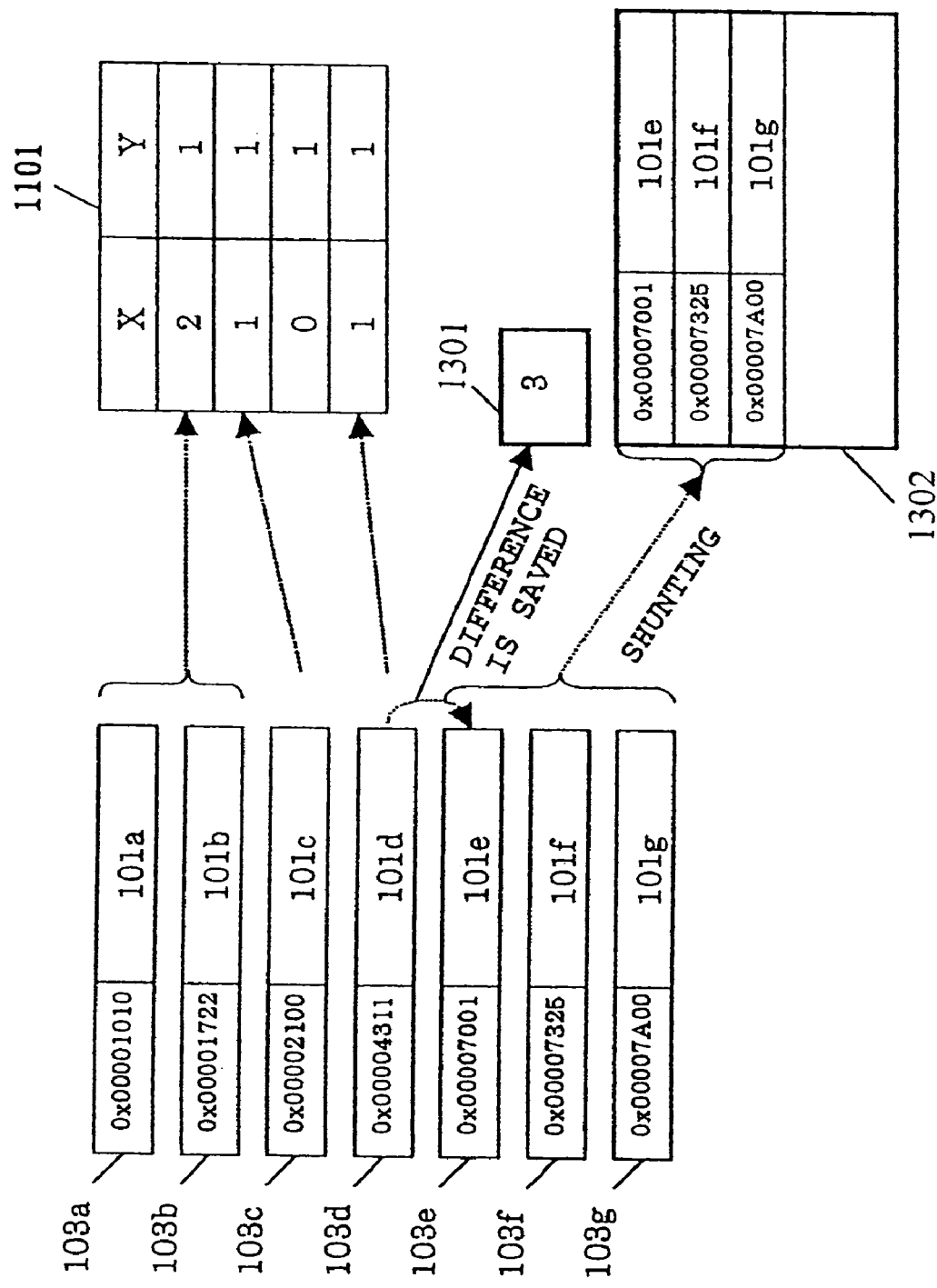
[FIG. 16]
Figure 17:
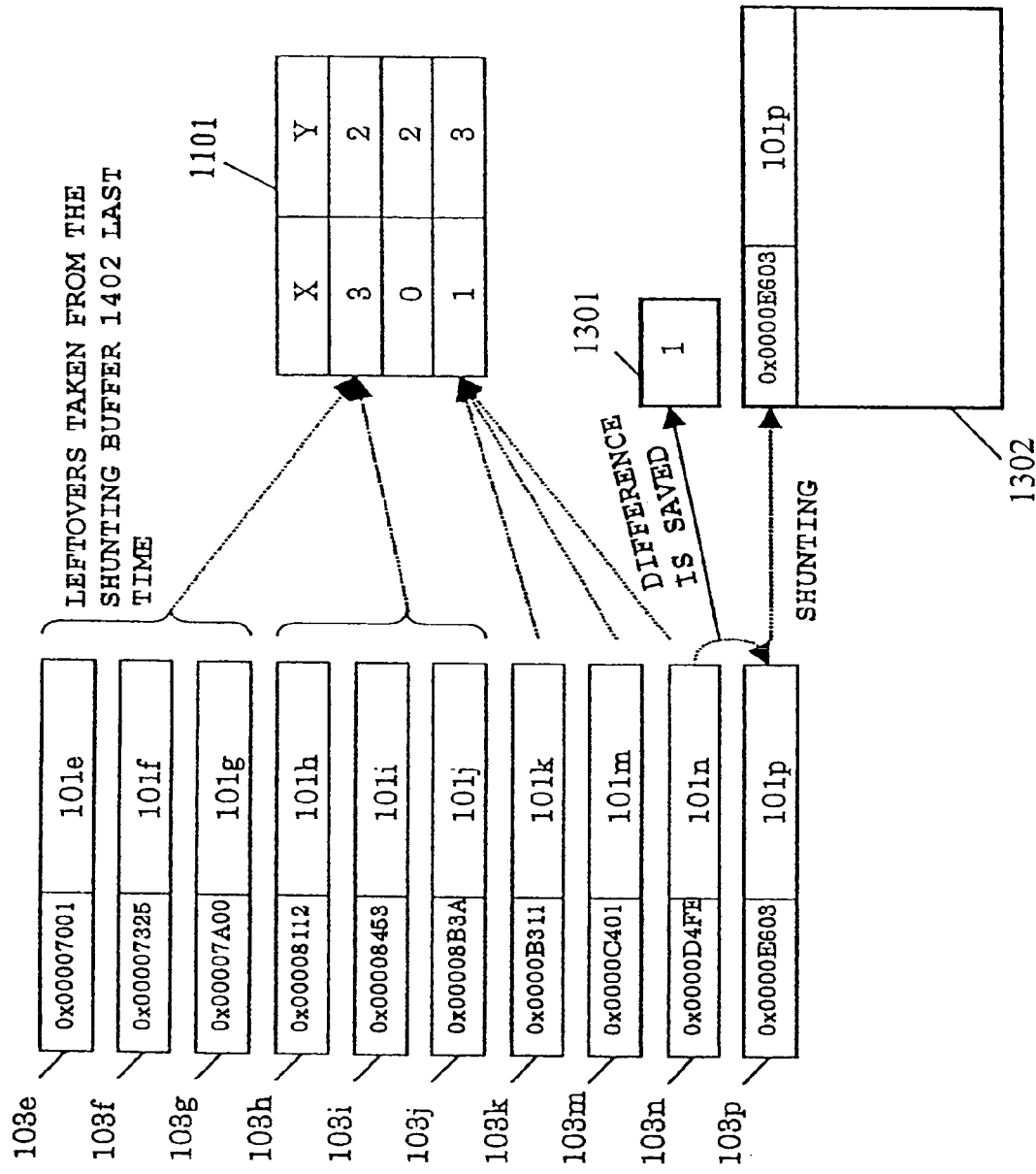
[FIG. 17]

FIGS. 16 and 17 exemplify output results of transmission packet mode list 1101.

In FIG. 15, the description "X1=1;" means that 1 is substituted for X1 as in FIGS. 11 to 13.

Operations of the time stamp sample judging part 705 will be described as follows.

As an initial state, J=0 shall be adopted for substitution.

In addition, T units of source packets 103 shall be simultaneously transmitted to the time stamp sample judging part 705 as well as the CIP producing part 703.

At first, upon receipt of T units of the source packets 103, processing starts in Step 201, and 1 is substituted for X1, 0 is for Y1, 0 is for X2 and 0 is for Y2 respectively in Step 202.

In Step 203, a value of J is judged and in case of J>0, the step goes forward to Step 204 and otherwise the step goes forward to Step 207.

In Step 204, a value of N0 is judged and in case of N0>1, the step goes forward to Step 205 and otherwise the step goes forward to Step 206.

In Step 205, (0, $N_0$−1) is added to the transmission packet mode list 1101 and J is substituted for X1 and 1 is for Y1 in Step 206 ($N_0$) respectively.

In Step 207, among T units of source packets 103 received in Step 201, the last source packet and all the source packets that have the same value as the Cycle_Count of the time stamp 201 of the last source packet and are brought into connection in series with the last source packet are stored in the shunting buffer 1302. For example, in FIG. 16, three units of the source packet 103e, the source packet 103f and the source packet 103g are stored in the shunting buffer 1302.

In Step 208, the number of units of source packets stored in the shunting buffer 1302 is stored into J, and at the same time, the difference between the Cycle_Count value of the time stamp 201 of the last source packet and the Cycle_Count value of the time stamp 201 of the last source packet that was not stored into the shunting buffer 1302 is stored into the buffer for final difference 1301 as the final difference N0. In the example of FIG. 16, 3 being the difference between the Cycle_Count value of the time stamp 201 of the source packet 103d and the Cycle_Count value of the time stamp 201 of the source packet 103g is stored in the buffer for final difference 1301 as the final difference N0.

The source packet that was stored in the shunting buffer 1302 will not be processed this time, but will be processed in Step 203 to Step 206 when T units of source packets are received next time. For example, the source packet 103e, the source packet 103f and the source packet 103g that were stored in FIG. 16 will be processed firstly prior to processing of the received source packet when the source packet is received next time as in FIG. 17.

In Step 209, processes in FIGS. 11 to 13 having been described in the second Embodiment are subsequently executed on the received source packets 103 so that in Step 210, it is judged whether or not processes on the (T−J) units of source packets 103 have been entirely finalized, and if all are finalized, the step goes forward to Step 210, and otherwise the step goes back to Step 209 so that processing proceeds on the next source packet.

At the point of time when the step goes forward to Step 211, survey on all the T units of received source packets 103 or storage thereof into the shunting buffer 1302 will be finalized. Step 211 and onwards will be processing to add the remaining values in (X1, Y1) as well as (X2, Y2) to the transmission packet mode list 1101.

In Step 211, the value of the flag F is judged and in case of F=FALSE, the step goes forward to Step 212 while in case of F=TRUE, the step goes forward to Step 213.

In Step 212, (X1, Y1) is added to the transmission packet mode list 1101, and the step goes forward to Step 218.

Moreover, in Step 213, the values of X1 and X2 are brought into comparison so that in case of X1=X2, the step goes forward to Step 214 and otherwise the step goes forward to Step 216.

In Step 214, Y1+1 is substituted for Y1 and (X1, Y1) is added to the transmission packet mode list 1101 in Step 215 so that the step goes forward to Step 218.

In Step 216, (X1, Y1) is added to the transmission packet mode list 1101 while (X2, Y2) is added to the transmission packet mode list 1101 in Step 217 so that the step goes forward to Step 218.

Lastly, the processing comes to an end in Step 218.

Output results of the transmission packet mode list 1101 at the time when the processing as described so far has been executed will be expressed in FIGS. 16 and 17.

Incidentally, T=7 is adopted in FIGS. 16 and 17, but T may adopt another value, and moreover T may be a fixed value or may be a variable value.

In addition, a part of or the whole of each Step in FIG. 15 may be constructed of softwares.

Fourth Embodiment

A fourth Embodiment of the present invention will be described with reference to FIGS. 18 to 21 as follows.

Figure 18:
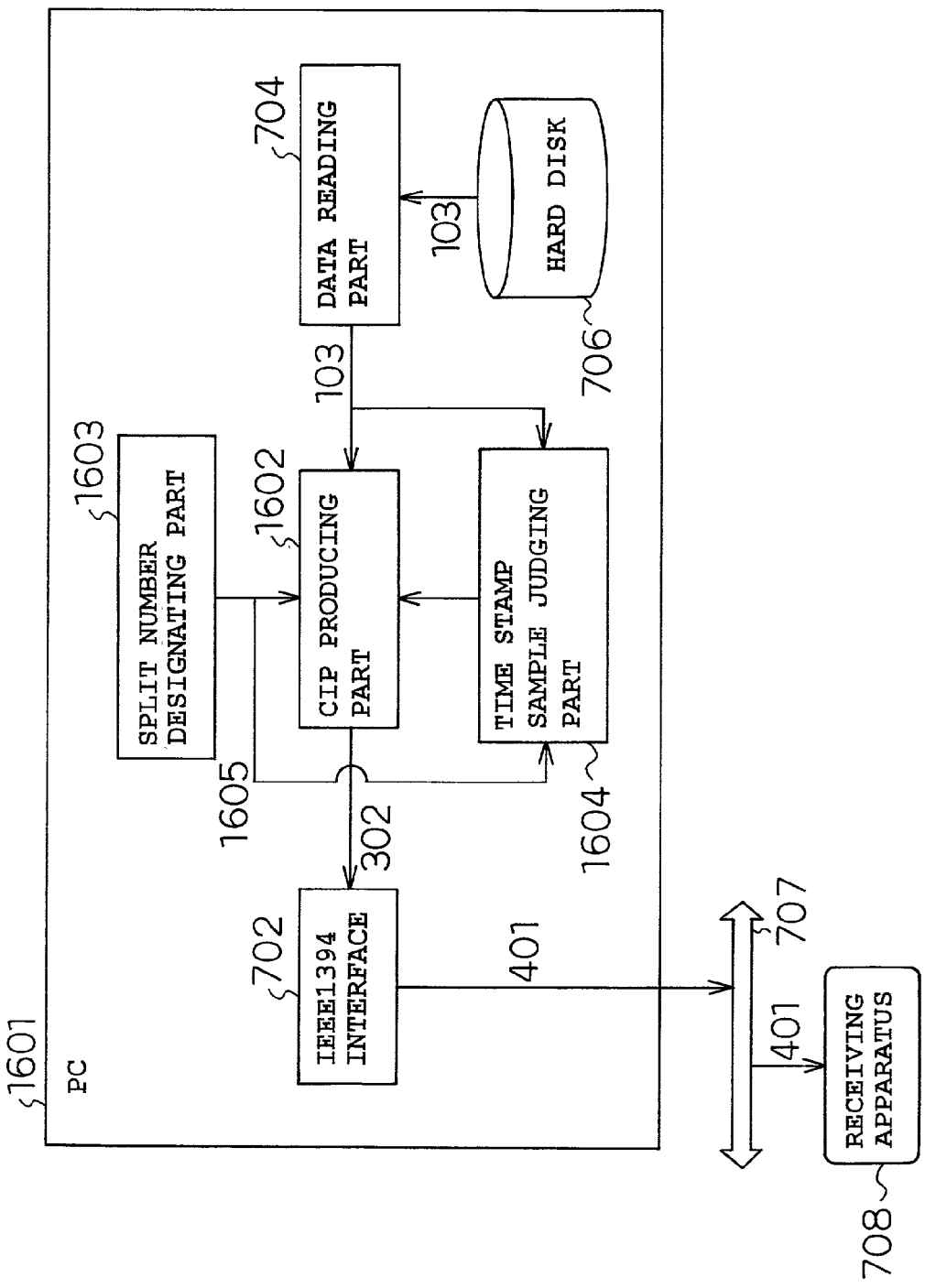
[FIG. 18]

FIG. 18 is an example of a transmitting apparatus. In FIG. 18, reference numeral 1601 denotes a PC, reference numeral 1602 does a CIP producing part, reference numeral 1603 does a split number designating part, reference numeral 1604 does a time stamp sample judging part and reference numeral 1605 does a split number.

Figure 19:
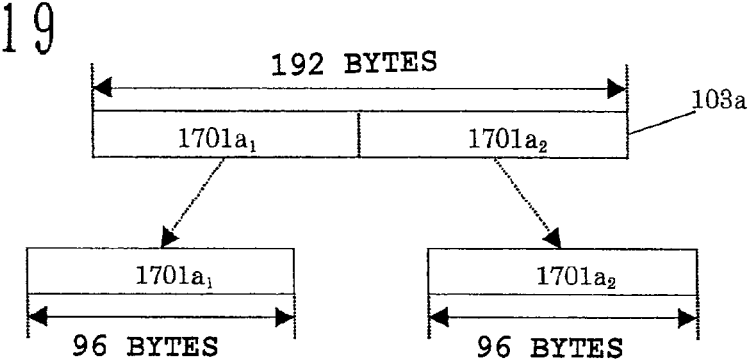
[FIG. 19]

FIG. 19 is an example of splitting method of the source packet 103*a*. In FIG. 19, reference numerals 1701*a*1 and 1701*a*2 denote splitting blocks.

Figure 20:
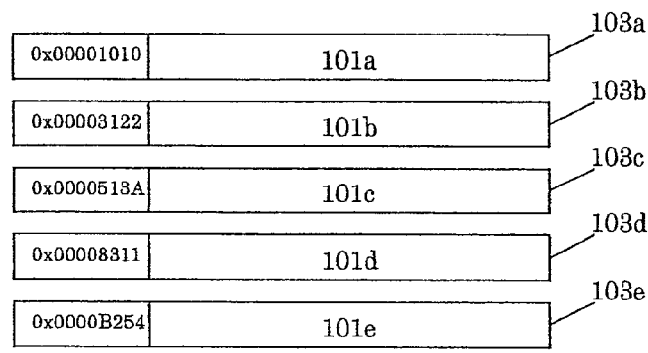
[FIG. 20]

FIG. 20 is an example of source packet data read out from a hard disk 706.

Figure 21:
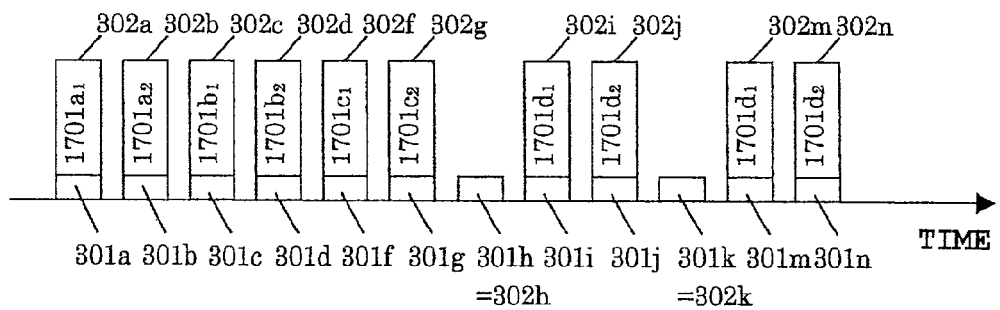
[FIG. 21]

FIG. 21 is a construction of the CIP produced from the source packet data in FIG. 20.

Incidentally, the PC 1601 of the present embodiment is an example of transmitting apparatus of the present invention.

Incidentally, at the time when MPEG2-TS data are transmitted, in the case where a data rate is sufficiently low, the source packet 103 can be split to construct the CIP data 302 so that the transmitting band width of the IEEE1394 bus for use is made less. For example, in case of FIG. 19, the source packet 103*a* with 192 bytes are split into a splitting block 1701*a*1 and a splitting block 1701*a*2 respectively with 96 bytes. To this splitting block 1701*a*1, the CIP header 301 is added to construct the CIP data 302 as in the case where splitting does not take place.

This split number can take any of 2, 4 or 8, and is split equally by 96 bytes, 48 bytes and 24 bytes respectively. The split number will not undergo any changes until transmission of series of data comes to an end.

Now, operations of the PC 1601 will be described.

At first in the hard disk 706, TS packet data are stored as in the first Embodiment in a format as in FIG. 8.

At first, prior to data transmission, the split number designating part 1603 takes a split number 1605 in advance and will have outputted, for example, M=2 to the CIP producing part 1602 and the time stamp sample judging part 1604. The designated split number 1605 shall not under any changes until transmission is finalized.

The data reading part 704 reads out the source packet 103, that is, a pair of a source packet header 102 and a TS packet 101 from the hard disk 706 so as to output to the CIP producing part 1602 and the time stamp sample judging part 1604.

The time stamp sample judging part 1604 extracts the time stamp 201 from the received source packet header 102, and takes the difference N between the Cycle_Count value of that time stamp 201 and the Cycle_Count value of that time stamp 201 having been included in the source packet header 102 received immediately prior thereto. However, in case of the initially received source packet 103, N=1 shall be taken.

At this time, for variable values A being A≧0, under N≦(A+1), the received source packet 103 is split into M=2 units and the CIP producing part 1602 is instructed to construct the CIP data 301.

Here, with Nc being the difference between the Cycle_Count value of that time stamp 201 included in the initially received source packet 103 and the Cycle_Count value of that time stamp 201 included in the source packet 103 received at this time and with P units being the number of units of the CIP data 301 having been produced up to then including the Empty packets, the value of A will be caused to change so as to get closer to Nc=P as much as possible. However, the Cycle_Count can only take values of 0 to 7999, and is arranged to get back to 0 in case of exceeding 8000. Therefore, Nc is not simply the difference between values of the time stamp 201, but shall be the accumulated value up to then.

In addition, in case of N>(A+1), after the CIP producing part 1602 is instructed to insert (N−A−1) units of Empty packets, the received source packet 103 is split into M=2 units and the CIP producing part 1602 is instructed to construct the CIP data 301.

As a deciding method on A, with A=0 being the initial value, each time upon receipt of a new source packet 103 the CIP producing part 1602 is instructed, (A+M−N) shall be newly substituted for A in case of N≦(A+1) while (M−1) shall be substituted for A in case of N>(A+1).

For example, in case of FIG. 20, at first, for the source packet 103*a* being the initial source packet, N=1 is given, and at this point of time, due to A=0, N≦(A+1) is given, and therefore the source packet 103*a* is split into M=2 units and the CIP producing part 1602 is instructed to construct the CIP data 301. At this point of time, A=0+2−1=1 will be given.

For the source packet 103*b*, N=1 is given, and due to A=1, N≦(A+1) is given, and therefore the source packet 103*b* is split into M=2 units and the CIP producing part 1602 is instructed so as to construct the CIP data 301. At this point of time, A=1+2−2=1 will be given.

The source packet 103*c* will give rise to similar results, and also A=1 will be given.

In addition, for the source packet 103*d*, N=3 will be given, and due to A=1, N>(A+1) will be given. Therefore, at first, after the CIP producing part 1602 has been instructed to insert (3−1−1)=2 units of Empty packets, the CIP producing part 1602 is instructed to split the source packet 103*d* into M=2 units to produce the CIP data 301. In this case, A=2−1=1 will be given.

Well, the CIP producing part 1602 produces the CIP data 302 from the received source packet 103 according to the above described method to output them to the IEEE1394 interface 702.

In addition, upon receipt of instruction to insert the Empty packet, the CIP producing part 1602 produces the CIP data 302 constructed only of the CIP header 301 to output them to the IEEE1394 interface 702.

The IEEE1394 interface 702 adds an isochronous header 402, a header CRC 403 and data CRC 404 to the received CIP data 302 as in FIG. 4 so as to create isochronous packet 401 for an output to an IEEE1394 bus 707.

The outputted isochronous packet 401 is received, for example, by the receiving apparatus 708.

As described so far, splitting the TS packet data stored in the hard disk 706, the isochronous packet 401 is constructed and can be outputted to the IEEE1394 bus 707.

Incidentally, in the present embodiment, 2 was taken for the value of M, but any value of M=1, 2, 4 and 8 will do. However, in case of M=1, operations of the CIP producing part 1602 as well as the time stamp sample judging part 1604 shall operate as having been described for the first Embodiment.

In addition, the deciding method on A will not be limited to those having been described above, but any values that might give rise to Nc=P as much as possible may be determined any way.

Incidentally, the source packet 103 has been taken as the one stored in the hard disk 706, but a pair of the TS packet 101 and the time stamp 201 will do as well or another time information created from the time stamp 201 instead of the time stamp 201 will do as well. In this case, the time stamp 201 as well as the source packet header 102 are produced in the data reading part 704.

In addition, the data file on the hard disk 704 may be stored in an AVI file format, an ASF file format, or a QuickTime file format, or may not store additional information such as a header and a trailer.

In addition, the source packet header 102 and the TS packet 101 may not be stored in order as in FIG. 8.

In addition, the data to be transmitted are not limited to a MPEG2 TS packet, but a source packet including a source packet header will do.

In addition, apart of or the whole transmitting apparatus maybe constructed of softwares, or the transmitting apparatus may not be a PC.

Fifth Embodiment

An example of operations of the time stamp sample judging part 1604 in the fourth Embodiment of the present invention will be described as a fifth Embodiment of the present invention with reference to FIGS. 22 to 23 as follows.

Figure 22:
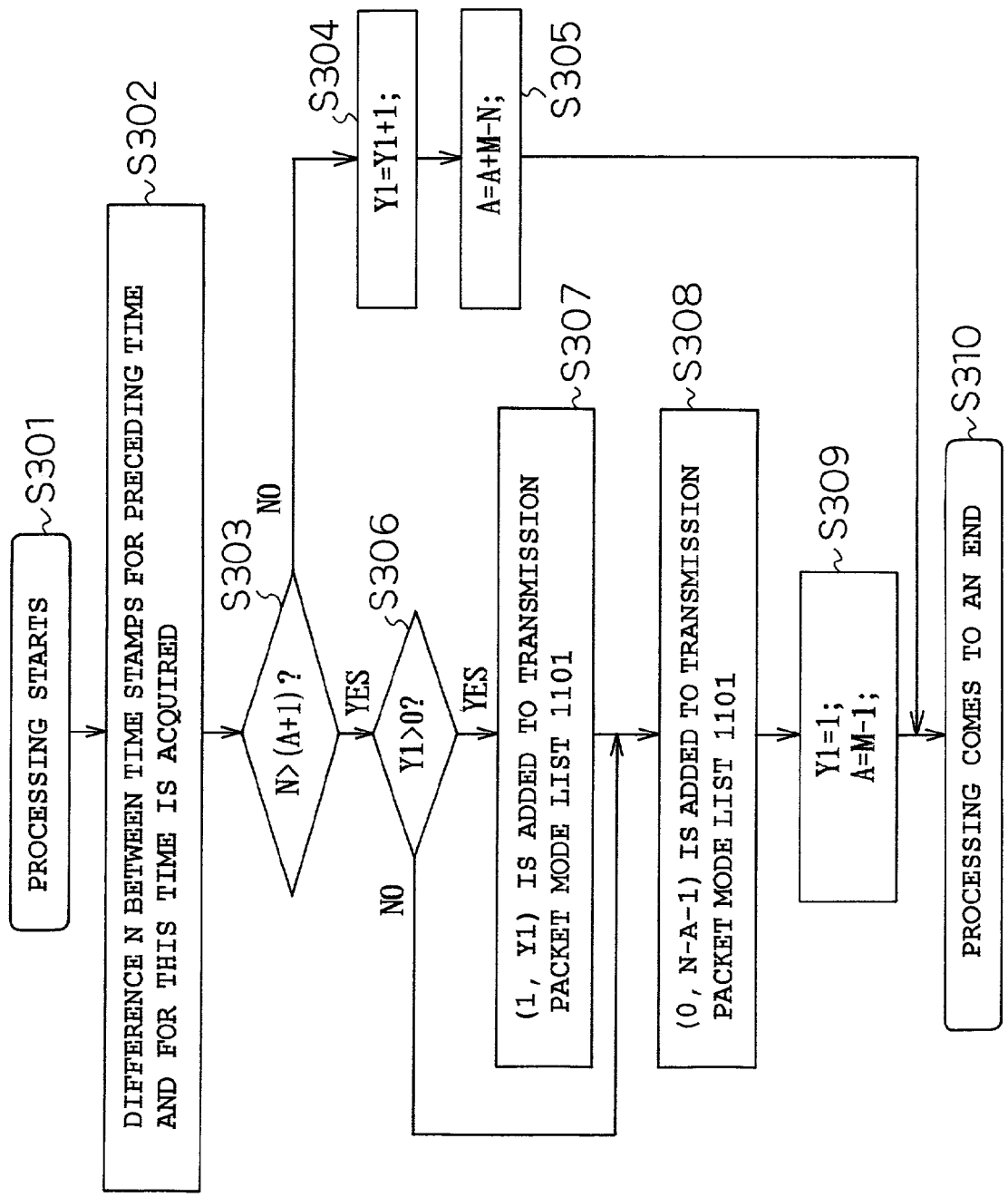
[FIG. 22]

FIG. 22 is a flowchart describing operations of the time stamp sample judging part 1604.

Figure 23:
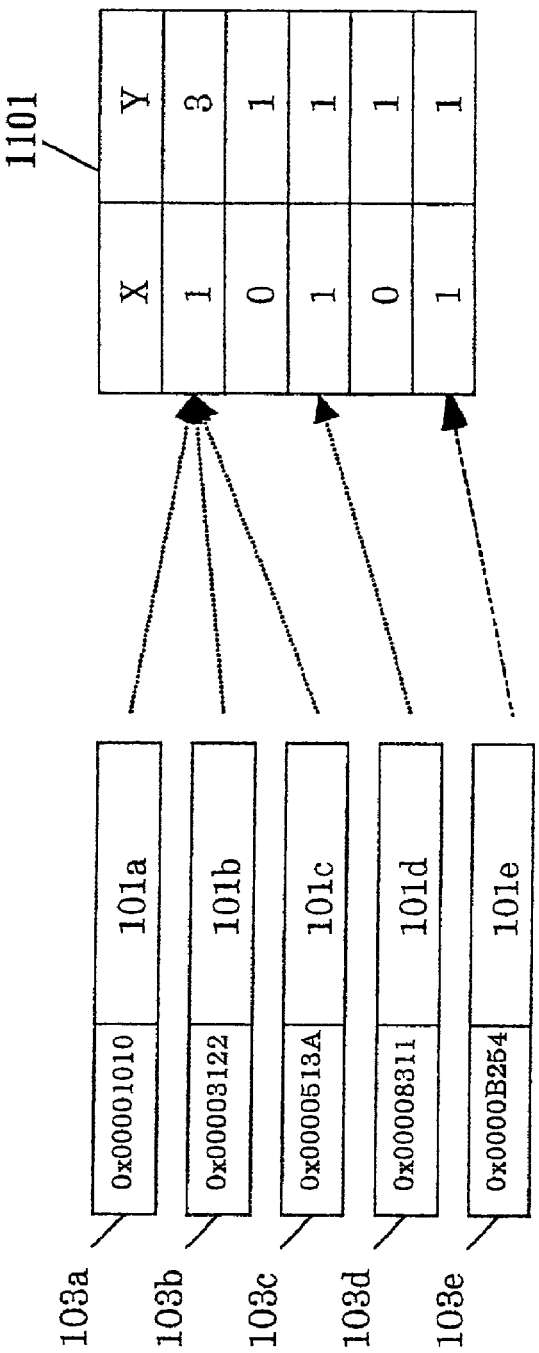
[FIG. 23]

FIG. 23 exemplifies output results of the transmission packet mode list 1101.

In FIG. 22, the description "X1=1;" means that 1 is substituted for X1 as in FIGS. 11 to 13.

Operations of the time stamp sample judging part 1604 will be described as follows.

As an initial state, A=0 and Y1=1 shall be adopted for substitution.

At first, upon receipt of the source packet 103, processing starts in Step 301, a time stamp of the source packet received immediately prior thereto in Step 302 and the time stamp of the source packet received this time are extracted so that the difference N between their respective Cycle_Count values is acquired. In case of the initially received source packet, N=1 shall be taken.

Next, in Step 303, the value of N is judged, and for N>(A+1), the step goes forward to Step 306, and otherwise the step goes forward to Step 304.

In Step 304, (Y1+1) is substituted for Y1 and in Step 305, (A+M−N) is for A, and the step goes forward to Step 310.

Moreover in Step 306, the value of Y1 is judged, and in case of Y1>0, the step goes forward to Step 307, and otherwise the step goes forward to Step 308.

In Step 307, (1, Y1) is added to the transmission packet mode list 1101 and the step goes forward to Step 308.

In Step 308, (0, N−A−1) is added to the transmission packet mode list 1101 so that 1 is substituted for Y1 and (M+1) is for A in Step 309 respectively and the step goes forward to Step 310.

Lastly, the processing comes to an end in Step 310.

Output results of the transmission packet mode list 1101 at the time when the processing as described so far has been executed on the source packet as in FIG. 20 will be expressed in FIG. 23. At this time, in case of X=1, the source packet 103 shall be split into M units of splitting blocks to produce the CIP data 302.

The CIP data 302 will be constructed based on this transmission packet mode list 1101 as in FIG. 21.

Thus, according to the present embodiment, based on the time stamp included in the source packet, the CIP data are produced so that the TS packet will become easily transmittable from a PC onto the IEEE1394.

In addition, a part of or the whole of each Step in FIG. 15 may be constructed of softwares.

Sixth Embodiment

A sixth Embodiment of the present invention will be described with reference to FIGS. 24 and 25 as follows.

Figure 24:
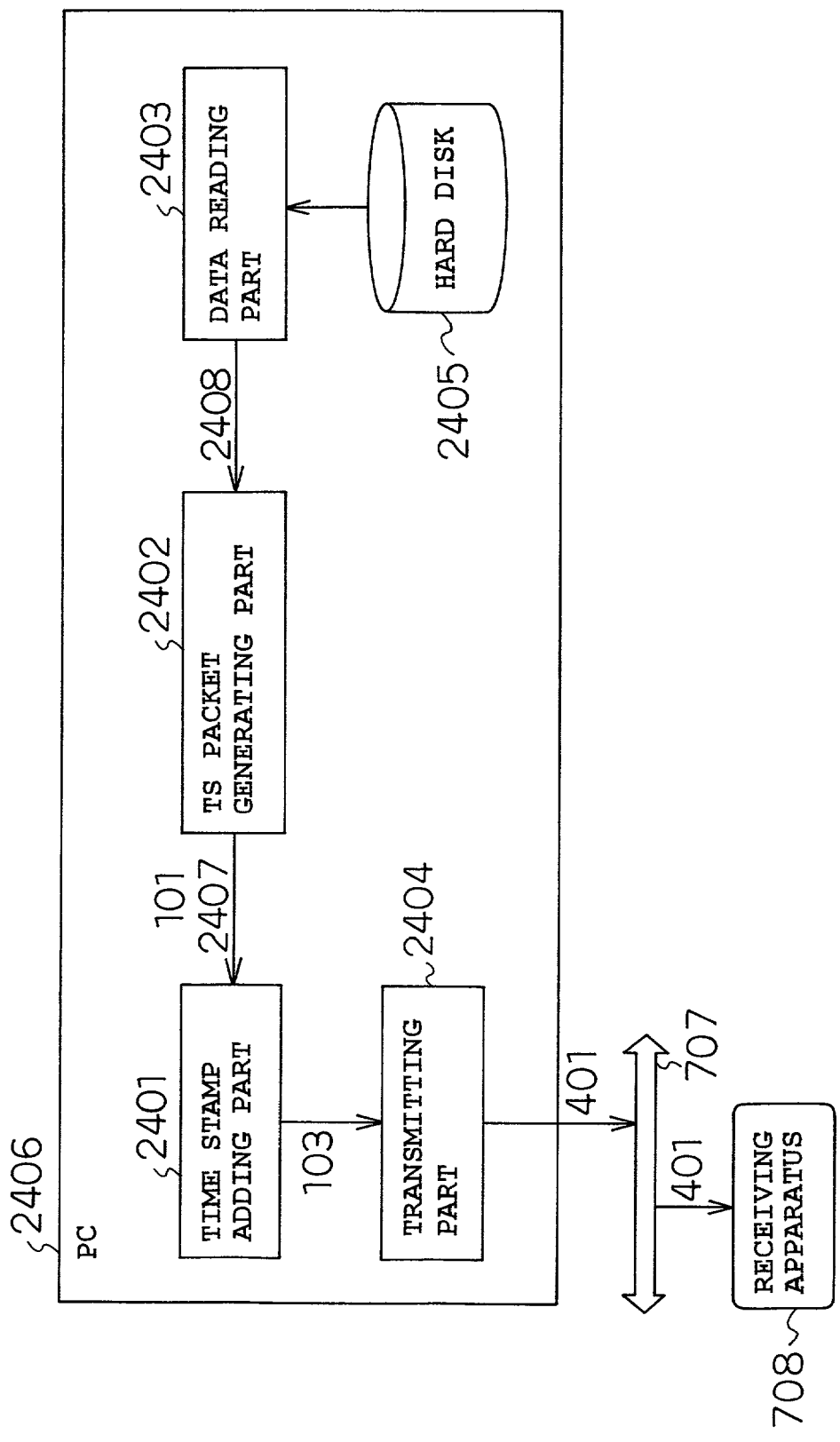
[FIG. 24]

FIG. 24 is an example of a source packet generating apparatus.

In FIG. 24, reference numeral 2401 denotes a time stamp adding part, reference numeral 2402 denotes a TS packet generating part, reference numeral 2403 denotes a data reading part, reference numeral 2404 denotes a transmitting part, reference numeral 2405 denotes a hard disk, reference numeral 2406 denotes a PC, reference numeral 2407 denotes time information, and reference numeral 2408 denotes a PS (Program Stream) packet.

Figure 25:
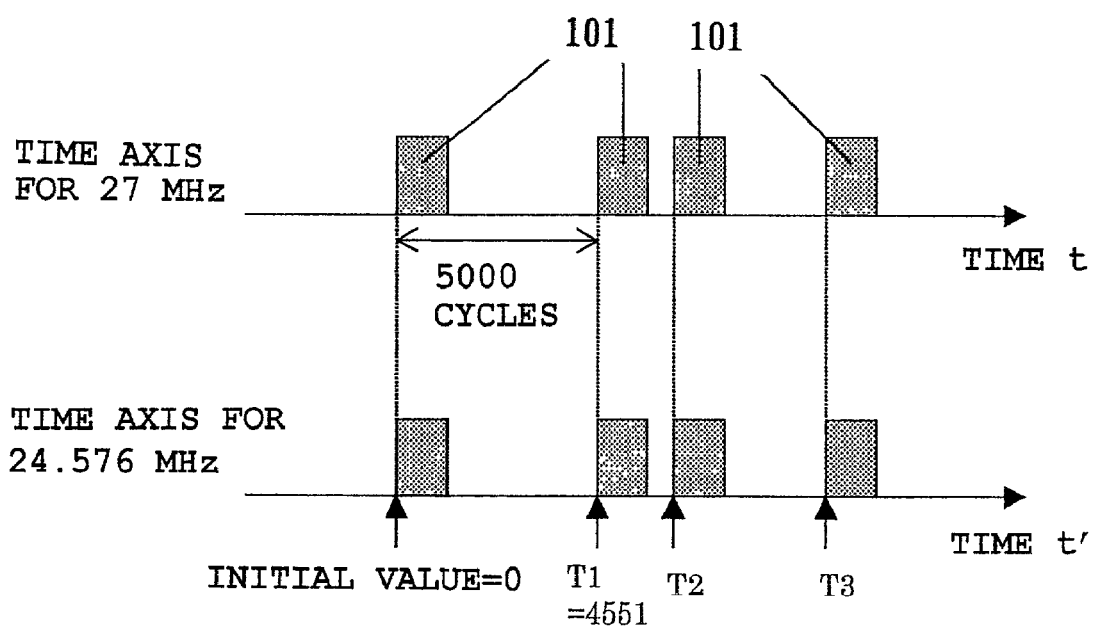
[FIG. 25]

FIG. 25 is an example of a method for generating the time stamp 201.

At first, the data reading part 2403 reads out the PS packet 2408 from the hard disk 2405 so as to output it to the TS packet generating part 2402.

The TS packet generating part 2402 generates the TS packet 101 corresponding with the MPEG2 standards from the received PS packet 2408 so as to output it to the time stamp adding part 2401. At this time, transmission timing of the TS packet 101 is determined by the TS packet generating part 2402, the time information 2407 on the time axis expressed by the operation clock (27 MHz) of the MPEG2 is outputted together.

Transmission timing of the TS packet 101 will become, for example, the time axis of 27 MHz in FIG. 25.

The time stamp adding part 2401 converts the received time information 2407 into time information on the time axis expressed by the operation clock (24.576 MHz) of the IEEE1394. Conversion of time information is executed, for example, as follows.

At first, time on the time axis in the operation clock of the IEEE1394 of the head TS packet 101a of the stream will be 0 as the initial value.

Next, time difference between a certain TS packet and the head TS packet 101a is converted into operation clock of IEEE1394. For example, as in FIG. 25, suppose that the time difference between the TS packet 101a and the TS packet 101b is 5000 cycles at 27 MHz being the operation clock of MPEG2, this is converted into 24.576 MHz being the operation clock of IEEE1394, approximately 4551 cycles will be given. Describing this as value of the CTR shown in FIG. 6, 0x000015C7 will be given, and 25 bits lower than this value will become the value of the time stamp to be added to the TS packet 101b.

The time stamp adding part 2401 outputs the one with the time stamp 201 produced as described so far having been added to the TS packet 101 to the transmitting part 2404 as the source packet 103.

The transmitting part 2404 executes operations similar to the CIP producing part 703, the IEEE1394 interface 702 and the time stamp sample judging part 705, for example, in the first Embodiment of the present invention so as to output the isochronous packet 401 to the IEEE1394 bus 707. The outputted isochronous packet 401 is transmitted to the receiving apparatus 708 and the like via the IEEE1394 bus 707.

As described so far, from the TS packet 103 as well as the time information 2407 generated from the PS packet data stored in the hard disk 2405, the time stamp 201 is generated and added so that the source packet 103 is generated and the isochronous packet 401 is constructed from the source packet 103 and can be outputted to the IEEE1394 bus 707.

Incidentally, the time stamp adding part 2401 is to generate the time stamp 201 by converting the time difference between a certain TS packet and the head TS packet 101a into operation clock of IEEE1394, but the time stamp to be added to a certain TS packet may be produced by a different method such as generating by adding values expressing the time difference between the immediately prior TS packet and that TS packet with operation clock of IEEE1394 to the value of the time stamp added to the immediately prior TS packet. In short, the only thing to do is to enable the time information expressed by the operation clock of MPEG2 to be expressed on the time axis of the operation clock of IEEE1394.

In addition, the time stamp adding part 2401 of the present embodiment has been described to generate the time stamp 201 by converting the time difference between a certain TS packet and the head TS packet 101a into the operation clock of IEEE1394, but will not be limited thereto. The time stamp 201 may be generated by converting the time difference with TS packet 101a other than the head into the operation clock of IEEE1394. In short, only thing to do is to generate the time stamp 201 by converting the time difference with a predetermined TS packet into the operation clock of IEEE1394.

In addition, the TS packet generating part 2402 is to convert the PS packet 2408 stored on the hard disk 2405 via the data reading part 2403 to the TS packet 101, but the PS packet 2408 may be stored not on the hard disk 2405 but in another recording apparatus, or may be outputted from LAN or the Internet and the like.

In addition, the TS packet generating part 2402 is to convert the PS packet 2408 into the TS packet 101, but may generate the TS packet 101 from other data, or receive inputs of the TS packet 101 from outside to generate that time information 2407 and may output it to the time stamp adding part 2401 together with the TS packet 101.

In addition, it may be arranged that the TS packet generating part 2402 adds a dummy time stamp with the same sizes as the time stamp 201 to the TS packet 101 instead of the TS packet 101 and the time stamp adding part 2401 is replaced with the time stamp 201 that has generated this dummy time stamp.

In addition, instead of outputs to the IEEE1394 bus 707 via the transmitting part 2404, the source packet 103 generated in the time stamp adding part 2401 maybe stored in the recording apparatus such as a hard disk etc. or be outputted to a LAN or the Internet etc.

In addition, instead of the TS packet 101, packet data other than the MPEG2 transport stream may be outputted. In short, anything will do if it is packet data based on an operation clock format different from that of IEEE1394, that require time information based on the CTR of IEEE1394 to be added at the time of transmission.

In addition, a part of or the whole source packet generating apparatus may be constructed of softwares, or the source packet generating apparatus may not be a PC.

Seventh Embodiment

A seventh Embodiment of the present invention will be described with reference to FIG. 26 as follows.

FIG. 26 is an example of a source packet generating apparatus. In FIG. 26, reference numeral 2601 denotes a buffer.

Operations of the data reading part 2403, the TS packet generating part 2402 and the time stamp adding part 2401 are similar to those in the sixth Embodiment of the present invention.

The time stamp adding part 2401 stores the one with the TS packet 101 to which the generated time stamp 201 has been added as the source packet 103 in the buffer 2601.

When the number of the stored source packets 103 reaches a constant amount, for example, 256 packets, the buffer 2601 outputs these source packets 103 to the transmitting part 2602 collectively.

The transmitting part 2602 outputs the isochronous packet 401 to the IEEE1394 bus 707 by executing operations similar to those of the CIP producing part 703, the IEEE1394 interface 702 and the time stamp sample judging part 705 in the first or third Embodiment. The outputted isochronous packet 401 is transmitted to the receiving apparatus 708 and the like via the IEEE1394 bus 707.

As described so far, from the TS packet 103 as well as the time information 2407 generated from the PS packet data stored in the hard disk 2405, the time stamp 201 is generated and added so that the source packet 103 is generated and the isochronous packet 401 is constructed from the source packet 103 and can be outputted to the IEEE1394 bus 706.

Incidentally, the time stamp adding part 2401 of the present embodiment is an example of time information adding means of the present invention.

Incidentally, the time stamp adding part 2401 is to generate the time stamp 201 by converting the time difference between a certain TS packet and the head TS packet 101a into operation clock of IEEE1394, but the time stamp to be added to a certain TS packet may be produced by a different method such as generating by adding values expressing the time difference between the immediately prior TS packet and that TS packet with operation clock of IEEE1394 to the value of the time stamp added to the immediately prior TS packet. In short, the only thing to do is to enable the time information expressed by the operation clock of MPEG2 to be expressed on the time axis of the operation clock of IEEE1394.

In addition, the TS packet generating part 2402 is to convert the PS packet 2408 stored on the hard disk 2405 via the data reading part 2403 to the TS packet 101, but the PS packet 2408 may be stored not on the hard disk 2405 but in another recording apparatus, or may be outputted from LAN or the Internet and the like.

In addition, the TS packet generating part 2402 is to convert the PS packet 2408 into the TS packet 101, but may generate the TS packet 101 from other data, or receive inputs of the TS packet 101 from outside to generate that time information 2407 and may output it to the time stamp adding part 2401 together with the TS packet 101.

In addition, it may be arranged that the TS packet generating part 2402 adds a dummy time stamp with the same sizes as the time stamp 201 to the TS packet 101 instead of the TS packet 101 and the time stamp adding part 2401 is replaced with the time stamp 201 that has generated this dummy time stamp.

In addition, instead of outputs to the IEEE1394 bus 707 via the transmitting part 2404, the buffer 2601 may store the stored source packet 103 in the recording apparatus such as a hard disk etc. or may output it to a LAN or the Internet etc.

In addition, instead of the TS packet 101, packet data other than the MPEG2 transport stream may be outputted. In short, anything will do if it is packet data based on an operation clock format different from that of IEEE1394, that require time information based on the CTR of IEEE1394 to be added at the time of transmission.

In addition, a part of or the whole source packet generating apparatus may be constructed of softwares, or the source packet generating apparatus may not be a PC.

Incidentally, the present invention is a program for executing a function of the whole of or a part of means (or apparatus, element, circuit or part etc.) of the transmitting apparatus or the source packet generating apparatus of the present invention described above with a computer and is a program to operate in collaboration with the computer.

Moreover, the present invention is a program for executing operations of the whole of or a part of steps (or processes, operations or functions etc.) of the packet mode determining method of the present invention described above with a computer and is a program to operate in collaboration with the computer, Moreover, the present invention is a medium bearing a program for executing all or a part of operations of the whole of or a part of steps of the packet mode determining method of the present invention described above with a computer, which is computer-readable, and in which the above described program read by the computer executes the above described operations in collaboration with the above described computer.

Moreover, the present invention is a medium bearing a program for executing all or a part of functions of all or a part of means of the transmitting apparatus or the source packet generating apparatus of the present invention described above with a computer, which is computer-readable, and in which the above described program read by the computer executes the above described functions in collaboration with the above described computer.

Incidentally, a part of means (or apparatus, elements, circuits, parts etc.) of the present invention and a part of steps (or processes, operations, functions etc.) of the present invention refer to several means or steps of the plurality of means or steps thereof or refer to a part of functions or a part of operations of one of means or step.

In addition, a computer-readable recording medium which stores a program of the present invention is also included in the present invention.

In addition, one mode of use of the program of the present invention may have an aspect in which the program is stored in the recording medium that can be read out by the computer, and operates in collaboration with the computer.

In addition, one mode of use of the program of the present invention may have an aspect in which the program is transmitted in a transmission medium, is read by the computer, and operates in collaboration with the computer.

In addition, the data structure of the present invention includes a database, a data format, a data table, a data list and kinds of data etc.

In addition, the recording medium includes a ROM etc., and the transmission medium includes transmission media such as the Internet etc., lights, electric waves and sound waves etc.

In addition, the computer of the present invention described above will not be limited to pure hardwares such as CPUs etc. but may include firmwares, OSs, and moreover peripheral equipment.

Incidentally, as having been described above, the construction of the present invention may be realized softwarewise or may be realized hardwarewise.

As apparent from what has been described so far, the present invention can provide transmitting apparatuses, transmitting method, packet mode determining methods, media and programs that can easily determine how the TS packet data are transmitted based on the values of the time stamp in the case where the TS packet data are read out from the recording apparatus such as the hard disk etc. and are transmitted with IEEE1394.

In addition, as apparent from what has been described so far, the present invention can provide source packet generating apparatus, source packet generating method, media and programs that can easily generate the value of the time stamp to be added to the TS packet data.

What is claimed is:

1. A transmitting apparatus for transmitting a transmission packet formed from a series of source packets, each source packet including a source packet data and a source packet header including a time stamp, comprising:
    transmission packet generating means determining a value within a predetermined portion of said time stamp of each of said source packets, grouping one or more of said source packets that have a same value, combining and outputting said grouped source packets having the same value as one unit of transmission packet data; and
    data outputting means producing the transmission packet by adding predetermined additional information to said unit of transmission packet data.

2. The transmitting apparatus according to claim 1, wherein said transmission packet generating means inserting (N−1) units of dummy transmission packet data between two units in a sequence of units,
    when a difference between the value of the two units is N≧2 where N is an integer.

3. The transmitting apparatus according to any of claims 1 to 2, wherein K units of said source packets having a variable length or a fixed length with K≧1 are inputted as a group to said transmission packet generating means.

4. The transmitting apparatus according to any of claims 1 to 2,
wherein said predetermined additional information includes a CIP header, an isochronous header, a header CRC and a data CRC,
said data outputting means includes: CIP header adding means adding said predetermined CIP header to said unit of transmission packet data; and
an IEEE1394 interface for producing said transmission packet by further adding said isochronous header, said header CRC and said data CRC to the unit of transmission packet data to which said predetermined CIP header is added and outputting said produced transmission packet.

5. The transmitting apparatus according to claim 4, wherein said source packet data includes a transport stream packet of MPEG.

6. The transmitting apparatus according to claim 5, wherein said time stamp is expressed with a Cycle_Count and a Cycle_Offset of a CycleTimeRegister of an IEEE1394 standard, and
said predetermined portion is a portion of said Cycle_Count.

7. A program embodied on a medium that can be processed by a computer containing instructions to cause a computer to perform the steps of:

determining a value within a predetermined portion of a time stamp of a source packet, grouping one or more source packets that have a same value, combining and outputting said grouped source packets having the same value as one unit of transmission packet data, and producing a transmission packet by adding predetermined additional information to said unit of transmission packet data, and outputting said produced transmission packet.

8. A transmitting method for transmitting a transmission packet formed from a series of source packets, each source packet including a source packet data and a source packet header including a time stamp, comprising:

a step of determining a value within a predetermined portion of said time stamp of each of said source packets, groping one or more of said source packets that have a same value, combining and outputting said grouped source packets having the same value as one unit of transmission packet data; and a step of producing the transmission packet by adding predetermined additional information to said unit of transmission packet data.

* * * * *